United States Patent
Hosseini et al.

(10) Patent No.: US 10,616,875 B2
(45) Date of Patent: Apr. 7, 2020

(54) TECHNIQUES AND APPARATUSES FOR DOWNLINK CHANNEL MONITORING

(71) Applicant: QUALCOMM Incorporated, San Diego, CA (US)

(72) Inventors: Seyedkianoush Hosseini, San Diego, CA (US); Wanshi Chen, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 27 days.

(21) Appl. No.: 15/969,257

(22) Filed: May 2, 2018

(65) Prior Publication Data
US 2018/0324769 A1    Nov. 8, 2018

Related U.S. Application Data

(60) Provisional application No. 62/502,275, filed on May 5, 2017.

(51) Int. Cl.
*H04W 72/04* (2009.01)
*H04L 5/00* (2006.01)
*H04B 7/06* (2006.01)

(52) U.S. Cl.
CPC ........ *H04W 72/042* (2013.01); *H04B 7/0697* (2013.01); *H04L 5/0023* (2013.01);
(Continued)

(58) Field of Classification Search
CPC ............ H04W 72/042; H04W 72/0446; H04B 7/0697; H04L 5/0023; H04L 5/004; H04L 5/0057; H04L 5/0053; H04L 5/0048
See application file for complete search history.

(56) References Cited

U.S. PATENT DOCUMENTS

| 2015/0085717 A1* | 3/2015 | Papasakellariou ........ H04L 5/14 370/280 |
| 2016/0128045 A1 | 5/2016 | Azarian et al. |

(Continued)

FOREIGN PATENT DOCUMENTS

| WO | WO-2017018618 A1 | 2/2017 |
| WO | WO-2017074156 A1 | 5/2017 |

OTHER PUBLICATIONS

International Search Report and Written Opinion—PCT/US2018/030895—ISA/EPO—dated Aug. 17, 2018.
(Continued)

*Primary Examiner* — Benjamin H Elliott, IV
*Assistant Examiner* — Nevena Zecevic Sandhu
(74) *Attorney, Agent, or Firm* — Harrity & Harrity, LLP

(57) ABSTRACT

Certain aspects of the present disclosure generally relate to wireless communication. In some aspects, a wireless communication device may receive a plurality of resource blocks of a short channel mapped using a short resource element group (sREG) to short control channel element (sCCE) mapping. The short channel may be a short physical downlink control channel (sPDCCH) or a short physical downlink shared channel (sPDSCH). The wireless communication device may process the short channel using the plurality of resource blocks. The plurality of resource blocks may be bundled into a set of resource block bundles based at least in part on the sREG-to-sCCE mapping.

30 Claims, 11 Drawing Sheets

(52) U.S. Cl.
CPC .......... *H04L 5/0044* (2013.01); *H04L 5/0048* (2013.01); *H04L 5/0053* (2013.01); *H04W 72/0446* (2013.01); *H04L 5/0057* (2013.01)

(56) References Cited

U.S. PATENT DOCUMENTS

| | | | |
|---|---|---|---|
| 2016/0211960 A1* | 7/2016 | Wang | H04L 25/0224 |
| 2016/0337178 A1* | 11/2016 | Frenne | H04L 41/0803 |
| 2017/0099127 A1 | 4/2017 | Byun et al. | |
| 2017/0171842 A1 | 6/2017 | You et al. | |
| 2018/0206266 A1 | 7/2018 | Byun et al. | |
| 2019/0045487 A1* | 2/2019 | You | H04L 5/0007 |

OTHER PUBLICATIONS

Nokia., et al., "On DL Control Channel Design for Shorter TTI Operation," 3GPP Draft, R1-1704806, 3GPP TSG-RAN WG1, Meeting #88bis, Spokane, U.S.A, Apr. 3-7, 2017, XP051242942, Retrieved from the Internet: URL: http://www.3gpp.orgjftp/Meetings_3GPP_SYNC/RAN1/Docs/ [retrieved on Apr. 2, 2017].

NTT Docomo Inc., "Views on sTTI Operation," 3GPP Draft, R1-1612693, 3GPP TSG RAN WG1, Meeting #87, Reno, USA, Nov. 14-18, 2016, XP051176636, Retrieved from the Internet: URL: http://www.3gpp.orgjftp/Meetings 3GPP_SYNC/RAN1/Docs/ [retrieved on Nov. 13, 2016].

Zte., et al., "sPDCCH multiplexing with sPDSCH," 3GPP Draft, R1-1704641, 3GPP TSG RAN WG1, Meeting #88bis, Spokane, USA, Apr. 3-7, 2017, XP051251382, Retrieved from the Internet: URL: http://www.3gpp.org/ftp/tsg_ran/WG1_RL1/TSGR1_88b/Docs/ [retrieved on Mar. 25, 2017].

* cited by examiner

US 10,616,875 B2

TECHNIQUES AND APPARATUSES FOR DOWNLINK CHANNEL MONITORING

CROSS-REFERENCE TO RELATED APPLICATIONS UNDER 35 U.S.C. § 119

This application claims priority to US Provisional Patent Application No. 62/502,275, filed May 5, 2017, entitled "TECHNIQUES AND APPARATUSES FOR DOWNLINK CHANNEL MONITORING," which is hereby expressly incorporated by reference herein.

FIELD OF THE DISCLOSURE

Aspects of the present disclosure generally relate to wireless communication, and more particularly to techniques and apparatuses for downlink channel monitoring.

BACKGROUND

Wireless communication systems are widely deployed to provide various telecommunication services, such as telephony, video, data, messaging, and broadcasts. Typical wireless communication systems may employ multiple-access technologies capable of supporting communication with multiple users by sharing available system resources (e.g., bandwidth, transmit power, etc.). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, a national, a regional, and even a global level. An example of a telecommunication standard is Long Term Evolution (LTE). LTE is a set of enhancements to the Universal Mobile Telecommunications System (UMTS) mobile standard promulgated by Third Generation Partnership Project (3GPP). LTE is designed to better support mobile broadband Internet access by improving spectral efficiency, lowering costs, improving services, using new spectrum, and integrating with other open standards using OFDMA on the downlink (DL), SC-FDMA on the uplink (UL), and multiple-input multiple-output (MIMO) antenna technology.

SUMMARY

In some aspects, a method of wireless communication may be performed by a user equipment (UE). The method may include determining, when transmit diversity is enabled for a short channel and when using a short transmission time interval (sTTI) with the short channel, a monitoring period for receiving the short channel, wherein the sTTI is associated with a duration that is shorter than a duration of a transmission time interval (TTI) used with another channel. The method may include receiving, during the monitoring period, the short channel based at least in part on determining the monitoring period for receiving the short channel. The short channel may be a short physical downlink control channel (sPDCCH) or a short physical downlink shared channel (sPDSCH) and a number of useable tones of the short channel is an integer multiple of 2.

In some aspects, a wireless communication device may include a memory and one or more processors coupled to the memory. The one or more processors may be configured to determine, when transmit diversity is enabled for a short channel and when using an sTTI with the short channel, a monitoring period for receiving the short channel, wherein the sTTI is associated with a duration that is shorter than a duration of a transmission time interval (TTI) used with another channel. The one or more processors may be configured to receive, during the monitoring period, the short channel based at least in part on determining the monitoring period for receiving the short channel. The short channel may be an sPDCCH or an sPDSCH and a number of useable tones of the short channel is an integer multiple of 2.

In some aspects, a non-transitory computer-readable medium may store one or more instructions for wireless communication. The one or more instructions, when executed by one or more processors of a user equipment, may cause the one or more processors to determine, when transmit diversity is enabled for a short channel and when using an sTTI with the short channel, a monitoring period for receiving the short channel, wherein the sTTI is associated with a duration that is shorter than a duration of a transmission time interval (TTI) used with another channel. The one or more instructions, when executed by the one or more processors, may cause the one or more processors to receive, during the monitoring period, the short channel based at least in part on determining the monitoring period for receiving the short channel. The short channel may be an sPDCCH or an sPDSCH and a number of useable tones of the short channel is an integer multiple of 2.

In some aspects, an apparatus for wireless communication may include means for determining, when transmit diversity is enabled for a short channel and when using an sTTI with the short channel, a monitoring period for receiving the short channel, wherein the sTTI is associated with a duration that is shorter than a duration of a transmission time interval (TTI) used with another channel. In some aspects, the apparatus may include means for receiving, during the monitoring period, the short channel based at least in part on determining the monitoring period for receiving the short channel. The short channel may be an sPDCCH or an sPDSCH and a number of useable tones of the short channel is an integer multiple of 2.

In some aspects, the method of wireless communication may be performed by an access point. The method may include determining, when transmit diversity is enabled for a short channel and when using an sTTI with the short channel, a transmission period for transmitting the short channel, wherein the sTTI is associated with a duration that is shorter than a duration of a transmission time interval (TTI) used with another channel. The method may include transmitting, during the transmission period, the short channel based at least in part on determining the transmission period for transmitting the short channel. The short channel may be an sPDCCH or an sPDSCH.

In some aspects, a wireless communication device may include a memory and one or more processors coupled to the memory. The one or more processors may be configured to determine, when transmit diversity is enabled for a short channel and when using an sTTI with the short channel, a transmission period for transmitting the short channel, wherein the sTTI is associated with a duration that is shorter than a duration of a transmission time interval (TTI) used with another channel. The one or more processors may be configured to transmit, during the transmission period, the short channel based at least in part on determining the transmission period for transmitting the short channel. The short channel may be an sPDCCH or an sPDSCH.

In some aspects, the non-transitory computer-readable medium may store one or more instructions for wireless communication. The one or more instructions, when executed by one or more processors of an access point, may cause the one or more processors to determine, when transmit diversity is enabled for a short channel and when using an sTTI with the short channel, a transmission period for transmitting the short channel, wherein the sTTI is associated with a duration that is shorter than a duration of a transmission time interval (TTI) used with another channel. The one or more instructions, when executed by the one or more processors, may cause the one or more processors to transmit, during the transmission period, the short channel based at least in part on determining the transmission period for transmitting the short channel. The short channel may be an sPDCCH or an sPDSCH.

In some aspects, the apparatus for wireless communication may include means for determining, when transmit diversity is enabled for a short channel and when using an sTTI with the short channel that is shorter than a transmission time interval (TTI) for a channel, a transmission period for transmitting the short channel, wherein the sTTI is associated with a duration that is shorter than a duration of a transmission time interval (TTI) used with another channel. In some aspects, the apparatus may include means for transmitting, during the transmission period, the short channel based at least in part on determining the transmission period for transmitting the short channel. The short channel may be an sPDCCH or an sPDSCH.

In some aspects, the method of wireless communication may be performed by a user equipment. The method may include receiving a plurality of resource blocks of a short channel mapped using a short resource element group (sREG) to short control channel element (sCCE) mapping. The short channel may be an sPDCCH. The method may include processing the short channel using the plurality of resource blocks, wherein the plurality of resource blocks may be bundled into a set of resource block bundles based at least in part on the sREG-to-sCCE mapping.

In some aspects, a wireless communication device may include a memory and one or more processors coupled to the memory. The one or more processors may be configured to receive a plurality of resource blocks of a short channel mapped using a sREG-to-sCCE mapping. The short channel may be an sPDCCH. The one or more processors may be configured to process the short channel using the plurality of resource blocks, wherein the plurality of resource blocks may be bundled into a set of resource block bundles based at least in part on the sREG-to-sCCE mapping.

In some aspects, a non-transitory computer-readable medium may store one or more instructions for wireless communication. The one or more instructions, when executed by one or more processors of a user equipment, may cause the one or more processors to receive a plurality of resource blocks of a short channel mapped using a sREG-to-sCCE mapping. The short channel may be an sPDCCH. The one or more instructions, when executed by the one or more processors, may cause the one or more processors to process the short channel using the plurality of resource blocks, wherein the plurality of resource blocks may be bundled into a set of resource block bundles based at least in part on the sREG-to-sCCE mapping.

In some aspects, an apparatus for wireless communication may include means for receiving a plurality of resource blocks of a short channel mapped using a sREG-to-sCCE mapping. The short channel may be an sPDCCH. The apparatus may include means for processing the short channel using the plurality of resource blocks, wherein the plurality of resource blocks may be bundled into a set of resource block bundles based at least in part on the sREG-to-sCCE mapping.

Aspects generally include a method, apparatus, system, computer program product, user equipment, wireless communication device, access point, base station, and processing system as substantially described herein with reference to and as illustrated by the accompanying specification and drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

The detailed description set forth below, in connection with the appended drawings, is intended as a description of various configurations and is not intended to represent the only configurations in which the concepts described herein may be practiced. The detailed description includes specific details for providing a thorough understanding of the various concepts. However, it will be apparent to those skilled in the art that these concepts may be practiced without these specific details.

The techniques described herein may be used for one or more of various wireless communication networks such as code division multiple access (CDMA) networks, time division multiple access (TDMA) networks, frequency division multiple access (FDMA) networks, orthogonal FDMA (OFDMA) networks, single carrier FDMA (SC-FDMA) networks, or other types of networks. A CDMA network may implement a radio access technology (RAT) such as universal terrestrial radio access (UTRA), CDMA2000, and/or the like. UTRA may include wideband CDMA (WCDMA) and/or other variants of CDMA. CDMA2000 may include Interim Standard (IS)-2000, IS-95 and IS-856 standards. IS-2000 may also be referred to as 1x radio transmission technology (1xRTT), CDMA2000 1x, and/or the like. A TDMA network may implement a RAT such as global system for mobile communications (GSM), enhanced data rates for GSM evolution (EDGE), or GSM/EDGE radio access network (GERAN). An OFDMA network may implement a RAT such as evolved UTRA (E-UTRA), ultra mobile broadband (UMB), Institute of Electrical and Electronics Engineers (IEEE) 802.11 (Wi-Fi), IEEE 802.16 (WiMAX), IEEE 802.20, Flash-OFDM, and/or the like. UTRA and E-UTRA may be part of the universal mobile telecommunication system (UMTS). 3GPP long-term evolution (LTE) and LTE-Advanced (LTE-A) are example releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and RATs mentioned above as well as other wireless networks and RATs.

Figure 1:
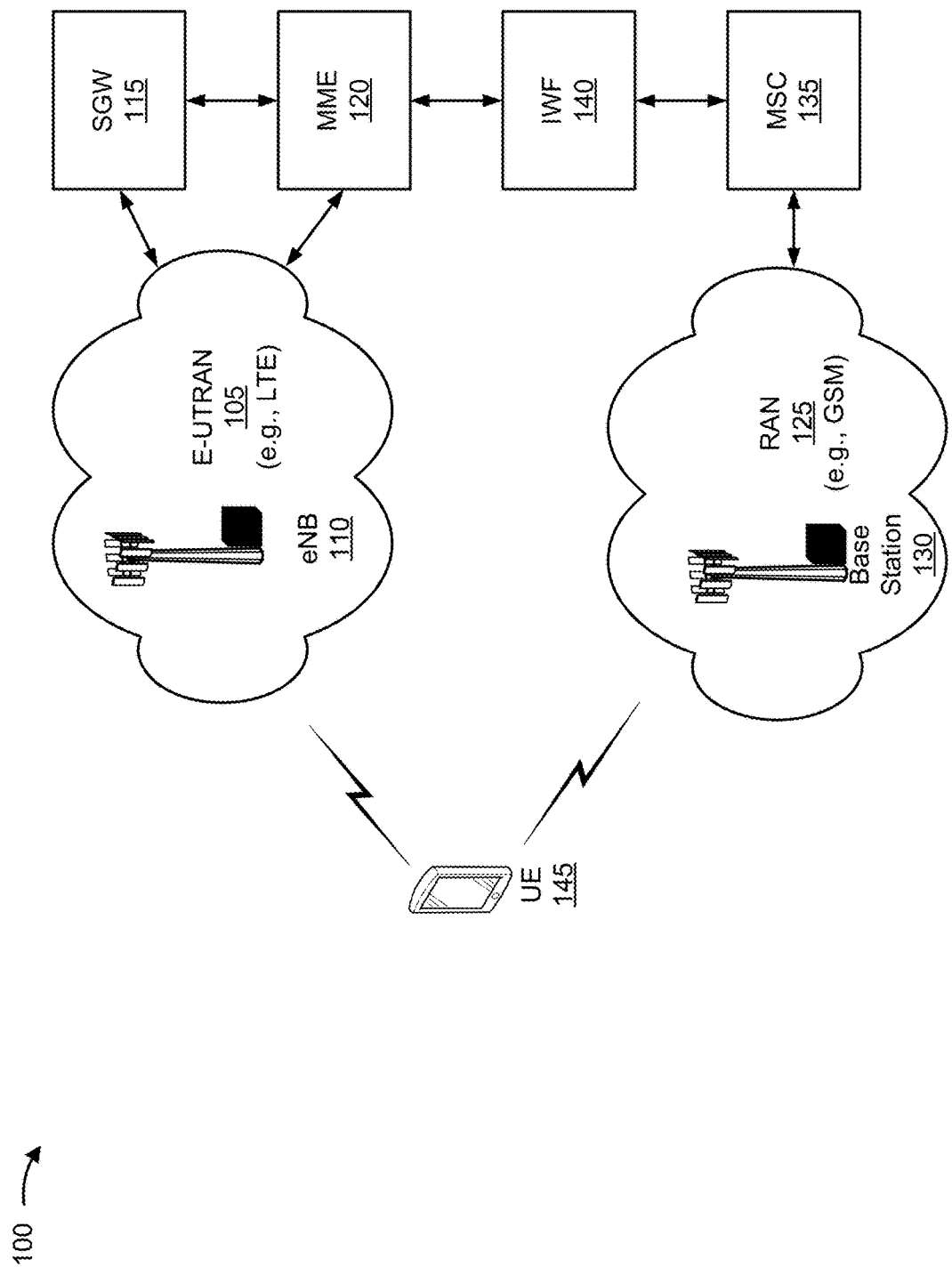
FIG. 1 is a diagram illustrating an example deployment in which multiple wireless networks have overlapping coverage, in accordance with various aspects of the present disclosure.

FIG. 1 is a diagram illustrating an example deployment 100 in which multiple wireless networks have overlapping coverage, in accordance with various aspects of the present disclosure. As shown, example deployment 100 may include an evolved universal terrestrial radio access network (E-UTRAN) 105, which may include one or more evolved Node Bs (eNBs) 110, and which may communicate with other devices or networks via a serving gateway (SGW) 115 and/or a mobility management entity (MME) 120. As further shown, example deployment 100 may include a radio access network (RAN) 125, which may include one or more base stations 130, and which may communicate with other devices or networks via a mobile switching center (MSC) 135 and/or an inter-working function (IWF) 140. As further shown, example deployment 100 may include one or more user equipment (UEs) 145 capable of communicating via E-UTRAN 105 and/or RAN 125.

E-UTRAN 105 may support, for example, LTE or another type of RAT. E-UTRAN 105 may include eNBs 110 and other network entities that can support wireless communication for UEs 145. Each eNB 110 may provide communication coverage for a particular geographic area. The term "cell" may refer to a coverage area of eNB 110 and/or an eNB subsystem serving the coverage area on a specific frequency channel.

SGW 115 may communicate with E-UTRAN 105 and may perform various functions, such as packet routing and forwarding, mobility anchoring, packet buffering, initiation of network-triggered services, and/or the like. MME 120 may communicate with E-UTRAN 105 and SGW 115 and may perform various functions, such as mobility management, bearer management, distribution of paging messages, security control, authentication, gateway selection, and/or the like, for UEs 145 located within a geographic region served by MME 120 of E-UTRAN 105. The network entities in LTE are described in 3GPP TS 36.300, entitled "Evolved Universal Terrestrial Radio Access (E-UTRA) and Evolved Universal Terrestrial Radio Access Network (E-UTRAN); Overall description," which is publicly available.

RAN 125 may support, for example, GSM or another type of RAT. RAN 125 may include base stations 130 and other network entities that can support wireless communication for UEs 145. MSC 135 may communicate with RAN 125 and may perform various functions, such as voice services, routing for circuit-switched calls, and mobility management for UEs 145 located within a geographic region served by MSC 135 of RAN 125. In some aspects, IWF 140 may facilitate communication between MME 120 and MSC 135 (e.g., when E-UTRAN 105 and RAN 125 use different RATs). Additionally, or alternatively, MME 120 may communicate directly with an MME that interfaces with RAN 125, for example, without IWF 140 (e.g., when E-UTRAN 105 and RAN 125 use a same RAT). In some aspects, E-UTRAN 105 and RAN 125 may use the same frequency and/or the same RAT to communicate with UE 145. In some aspects, E-UTRAN 105 and RAN 125 may use different frequencies and/or RATs to communicate with UEs 145. As used herein, the term base station is not tied to any particular RAT, and may refer to an eNB (e.g., of an LTE network) or another type of base station associated with a different type of RAT.

In general, any number of wireless networks may be deployed in a given geographic area. Each wireless network may support a particular RAT and may operate on one or more frequencies. A RAT may also be referred to as a radio technology, an air interface, etc. A frequency or frequency ranges may also be referred to as a carrier, a frequency channel, and/or the like. Each frequency or frequency range may support a single RAT in a given geographic area in order to avoid interference between wireless networks of different RATs.

UE 145 may be stationary or mobile and may also be referred to as a mobile station, a terminal, an access terminal, a wireless communication device, a subscriber unit, a station, and/or the like. UE 145 may be a cellular phone, a personal digital assistant (PDA), a wireless modem, a wireless communication device, a handheld device, a laptop computer, a cordless phone, a wireless local loop (WLL) station, etc.

Upon power up, UE 145 may search for wireless networks from which UE 145 can receive communication services. If UE 145 detects more than one wireless network, then a wireless network with the highest priority may be selected to serve UE 145 and may be referred to as the serving network. UE 145 may perform registration with the serving network, if necessary. UE 145 may then operate in a connected mode to actively communicate with the serving network. Alternatively, UE 145 may operate in an idle mode and camp on the serving network if active communication is not required by UE 145.

UE 145 may operate in the idle mode as follows. UE 145 may identify all frequencies/RATs on which it is able to find a "suitable" cell in a normal scenario or an "acceptable" cell in an emergency scenario, where "suitable" and "acceptable" are specified in the LTE standards. UE 145 may then camp on the frequency/RAT with the highest priority among all identified frequencies/RATs. UE 145 may remain camped on this frequency/RAT until either (i) the frequency/RAT is no longer available at a predetermined threshold or (ii) another frequency/RAT with a higher priority reaches this threshold. In some aspects, UE 145 may receive a neighbor list when operating in the idle mode, such as a neighbor list included in a system information block type 5 (SIB 5) provided by an eNB of a RAT on which UE 145 is camped. Additionally, or alternatively, UE 145 may generate a neighbor list. A neighbor list may include information identifying one or more frequencies, at which one or more RATs may be accessed, priority information associated with the one or more RATs, and/or the like.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) shown in FIG. 1 may perform one or more functions described as being performed by another set of devices shown in FIG. 1.

Figure 2:
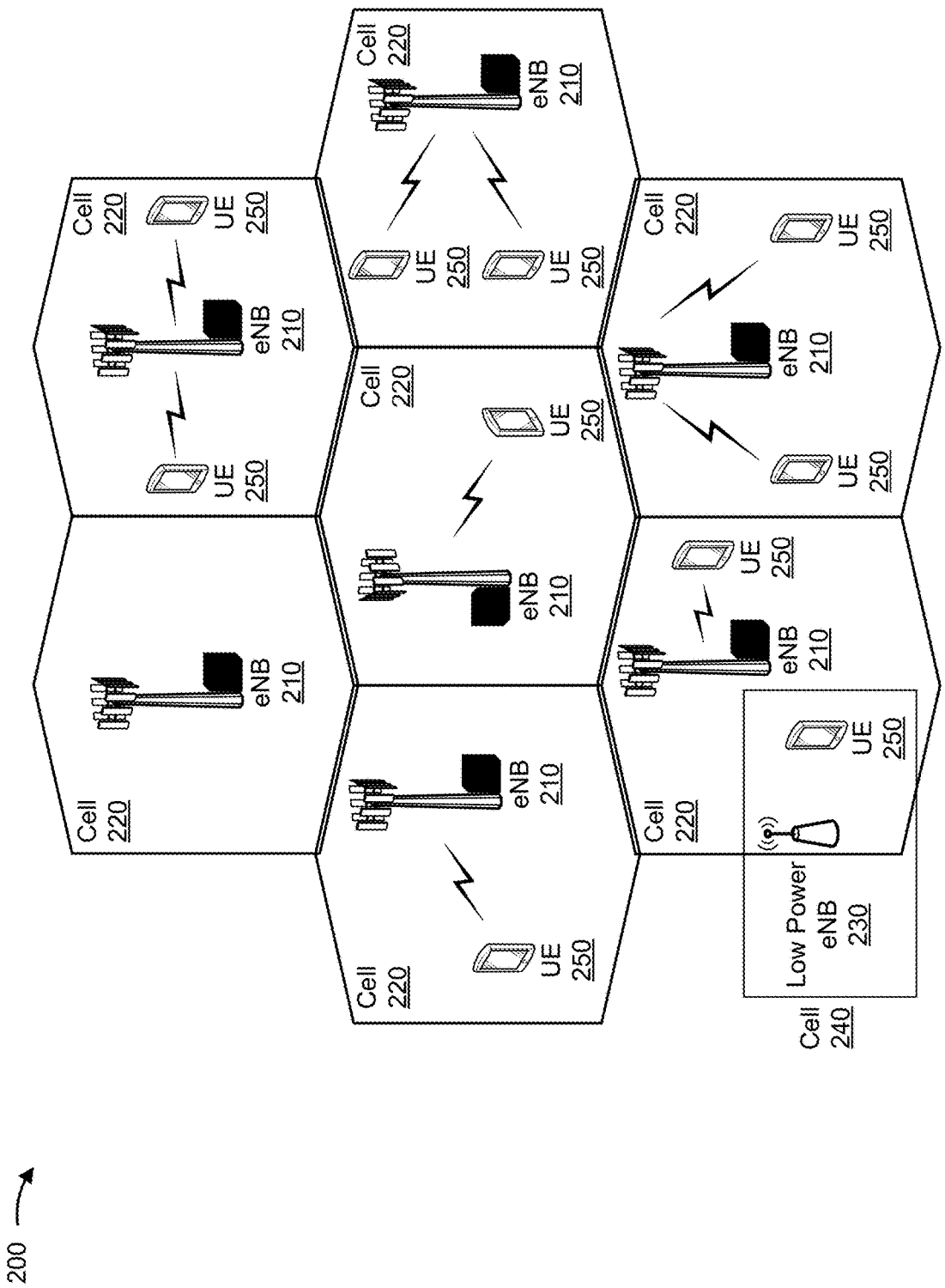
FIG. 2 is a diagram illustrating an example access network in an LTE network architecture, in accordance with various aspects of the present disclosure.

FIG. 2 is a diagram illustrating an example access network 200 in an LTE network architecture, in accordance with various aspects of the present disclosure. As shown, access network 200 may include one or more eNBs 210 (sometimes referred to as "base stations" herein) that serve a corresponding set of cellular regions (cells) 220, one or more low power eNBs 230 that serve a corresponding set of cells 240, and a set of UEs 250.

Each eNB 210 may be assigned to a respective cell 220 and may be configured to provide an access point to a RAN. For example, eNB 110, 210 may provide an access point for UE 145, 250 to E-UTRAN 105 (e.g., eNB 210 may correspond to eNB 110, shown in FIG. 1) or may provide an access point for UE 145, 250 to RAN 125 (e.g., eNB 210 may correspond to base station 130, shown in FIG. 1). In some cases, the terms base station and eNB may be used interchangeably, and a base station, as used herein, is not tied to any particular RAT. UE 145, 250 may correspond to UE 145, shown in FIG. 1. FIG. 2 does not illustrate a centralized controller for example access network 200, but access network 200 may use a centralized controller in some aspects. The eNBs 210 may perform radio related functions including radio bearer control, admission control, mobility control, scheduling, security, and network connectivity (e.g., to SGW 115).

As shown in FIG. 2, one or more low power eNBs 230 may serve respective cells 240, which may overlap with one or more cells 220 served by eNBs 210. The eNBs 230 may correspond to eNB 110 associated with E-UTRAN 105 and/or base station 130 associated with RAN 125, shown in FIG. 1. A low power eNB 230 may be referred to as a remote radio head (RRH). The low power eNB 230 may include a femto cell eNB (e.g., home eNB (HeNB)), a pico cell eNB, a micro cell eNB, and/or the like.

A modulation and multiple access scheme employed by access network 200 may vary depending on the particular telecommunications standard being deployed. In LTE applications, OFDM is used on the downlink (DL) and SC-FDMA is used on the uplink (UL) to support both frequency division duplexing (FDD) and time division duplexing (TDD). The various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. As another example, these concepts may also be extended to UTRA employing WCDMA and other variants of CDMA (e.g., such as TD-SCDMA, GSM employing TDMA, E-UTRA, and/or the like), UMB, IEEE 802.11 (Wi-Fi), IEEE 802.16 (WiMAX), IEEE 802.20, Flash-OFDM employing OFDMA, and/or the like. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 210 may have multiple antennas supporting MIMO technology. The use of MIMO technology enables eNBs 210 to exploit the spatial domain to support spatial multiplexing, beamforming, and transmit diversity. Spatial multiplexing may be used to transmit different streams of data simultaneously on the same frequency. The data streams may be transmitted to a single UE 145, 250 to increase the data rate or to multiple UEs 250 to increase the overall system capacity. This may be achieved by spatially precoding each data stream (e.g., applying a scaling of an amplitude and a phase) and then transmitting each spatially precoded stream through multiple transmit antennas on the DL. The spatially precoded data streams arrive at the UE(s) 250 with different spatial signatures, which enables each of the UE(s) 250 to recover the one or more data streams destined for that UE 145, 250. On the UL, each UE 145, 250 transmits a spatially precoded data stream, which enables eNBs 210 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

The number and arrangement of devices and cells shown in FIG. 2 are provided as an example. In practice, there may be additional devices and/or cells, fewer devices and/or cells, different devices and/or cells, or differently arranged devices and/or cells than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) shown in FIG. 2 may perform one or more functions described as being performed by another set of devices shown in FIG. 2.

Figure 3:
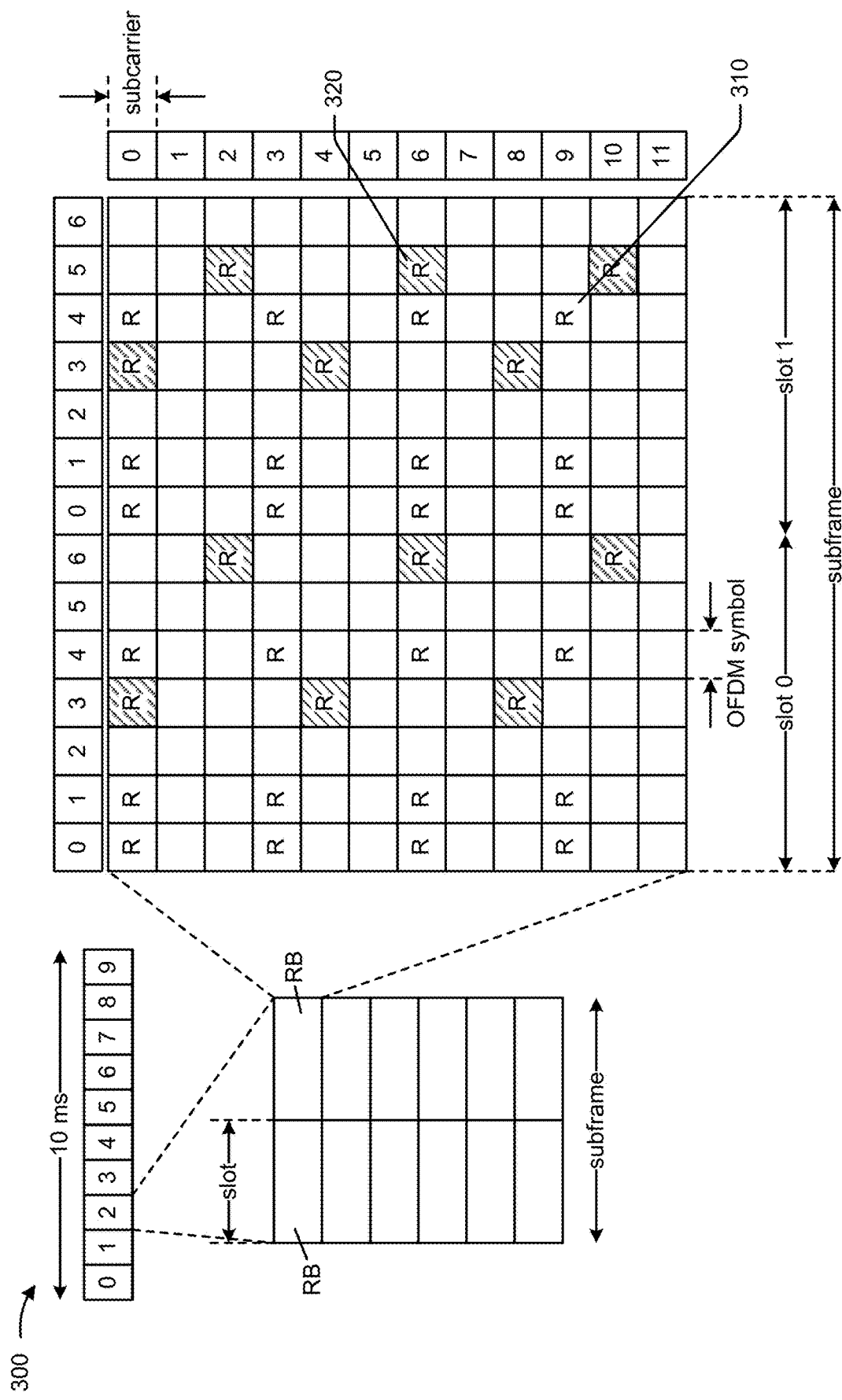
FIG. 3 is a diagram illustrating an example of a downlink frame structure in LTE, in accordance with various aspects of the present disclosure.

FIG. 3 is a diagram illustrating an example 300 of a downlink (DL) frame structure in LTE, in accordance with various aspects of the present disclosure. A frame (e.g., of 10 ms) may be divided into 10 equally sized sub-frames with indices of 0 through 9. Each sub-frame may include two consecutive time slots. A resource grid may be used to represent two time slots, each time slot including a resource block (RB). The resource grid is divided into multiple resource elements. In LTE, a resource block includes 12 consecutive subcarriers in the frequency domain and, for a normal cyclic prefix in each OFDM symbol, 7 consecutive OFDM symbols in the time domain, or 84 resource elements. For an extended cyclic prefix, a resource block includes 6 consecutive OFDM symbols in the time domain and has 72 resource elements. Some of the resource elements, as indicated as R 310 and R 320, include DL reference signals (DL-RS). The DL-RS include Cell-specific RS (CRS) (also sometimes called common RS) 310 and UE-specific RS (UE-RS) 320. UE-RS 320 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

In LTE, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix (CP). The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in the first symbol period of each subframe. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. The eNB may send a Physical HARQ Indicator Channel (PHICH) and a Physical Downlink Control Channel (PDCCH) in the first M symbol periods of each subframe. The PHICH may carry information to support hybrid automatic repeat request (HARQ). The PDCCH may carry information on resource allocation for UEs and control information for downlink channels. The eNB may send a Physical Downlink Shared Channel (PDSCH) in the remaining symbol periods of each subframe. The PDSCH may carry data for UEs scheduled for data transmission on the downlink.

The eNB may send the PSS, SSS, and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH, and PHICH in a broadcast manner to all UEs, may send the PDCCH in a unicast manner to specific UEs, and may also send the PDSCH in a unicast manner to specific UEs.

A number of resource elements may be available in each symbol period. Each resource element (RE) may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1, and 2. The PDCCH may occupy 9, 18, 36, or 72 REGs, which may be selected from the available REGs, in the first M symbol periods, for example. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

As indicated above, FIG. 3 is provided as an example. Other examples are possible and may differ from what was described above in connection with FIG. 3.

Figure 4:
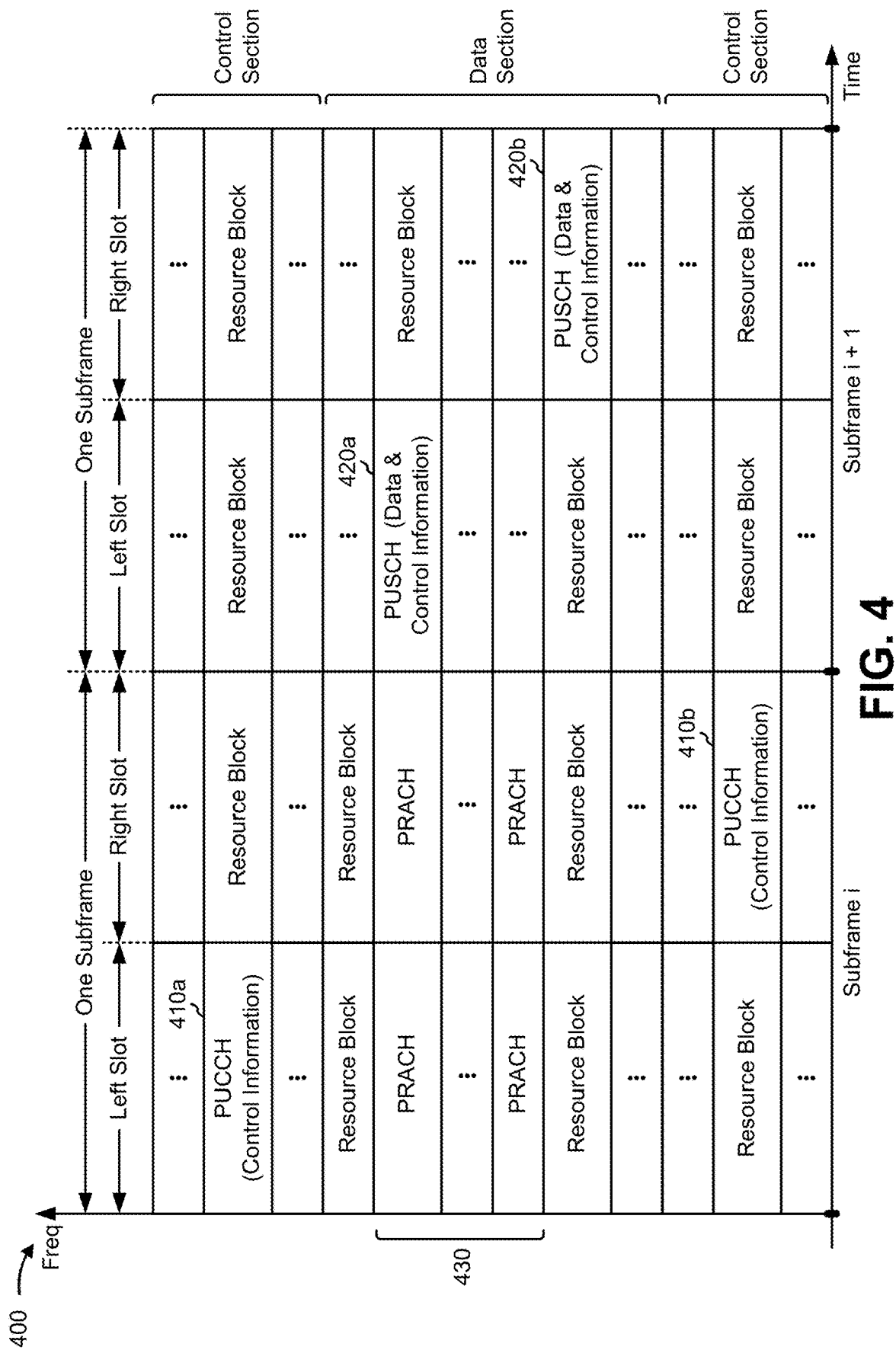
FIG. 4 is a diagram illustrating an example of an uplink frame structure in LTE, in accordance with various aspects of the present disclosure.

FIG. 4 is a diagram illustrating an example 400 of an uplink (UL) frame structure in LTE, in accordance with various aspects of the present disclosure. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB.

The UE may also be assigned resource blocks 420*a*, 420*b* in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequencies.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (e.g., of 1 ms) or in a sequence of few contiguous subframes and a UE can make only a single PRACH attempt per frame (e.g., of 10 ms).

As indicated above, FIG. 4 is provided as an example. Other examples are possible and may differ from what was described above in connection with FIG. 4.

Figure 5:
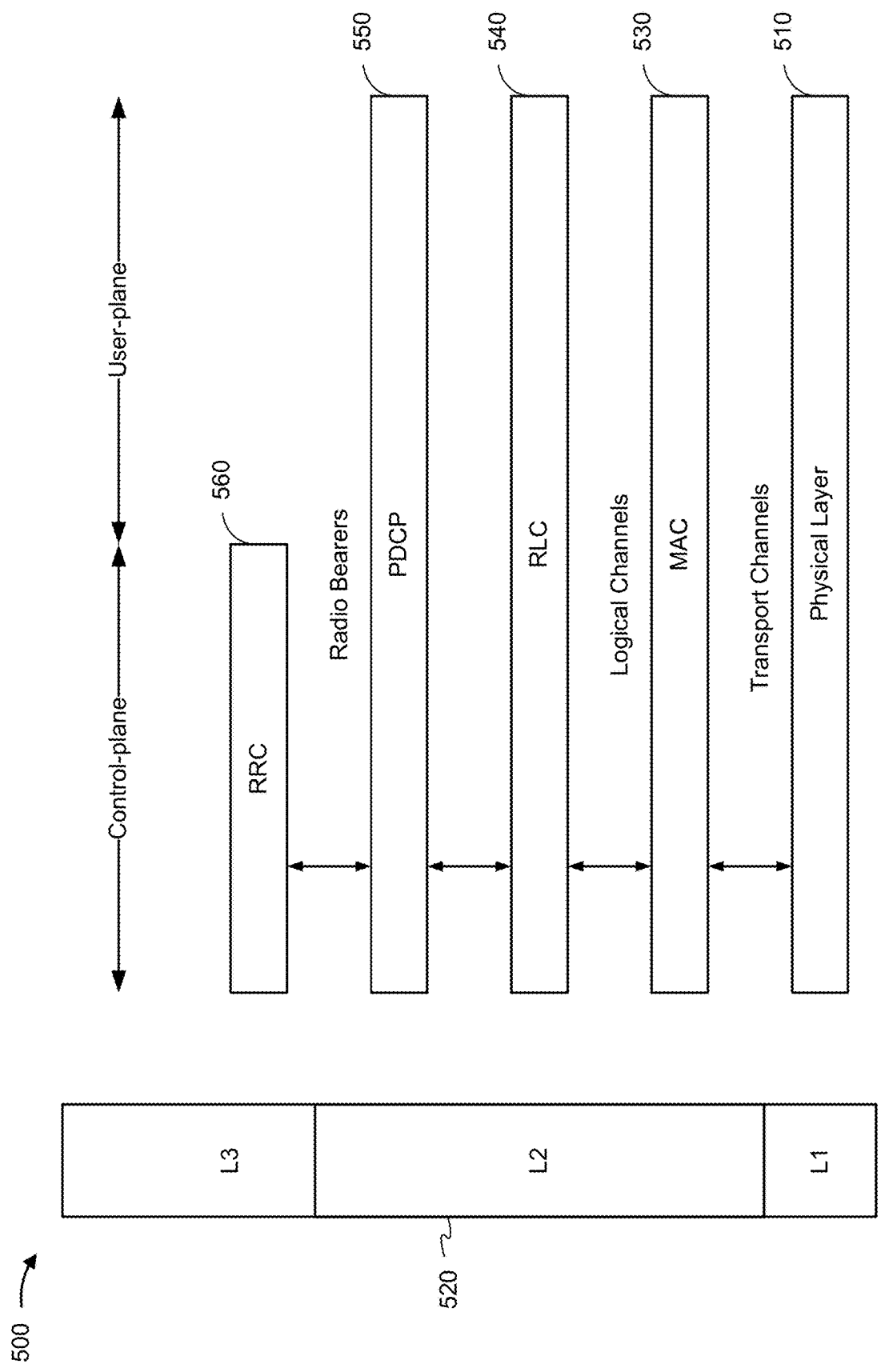
FIG. 5 is a diagram illustrating an example of a radio protocol architecture for a user plane and a control plane in LTE, in accordance with various aspects of the present disclosure.

FIG. 5 is a diagram illustrating an example 500 of a radio protocol architecture for a user plane and a control plane in LTE, in accordance with various aspects of the present disclosure. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 510. Layer 2 (L2 layer) 520 is above the physical layer 510 and is responsible for the link between the UE and eNB over the physical layer 510.

In the user plane, the L2 layer 520 includes, for example, a media access control (MAC) sublayer 530, a radio link control (RLC) sublayer 540, and a packet data convergence protocol (PDCP) sublayer 550, which are terminated at the eNB on the network side. Although not shown, the UE may have several upper layers above the L2 layer 520 including a network layer (e.g., IP layer) that is terminated at a packet data network (PDN) gateway on the network side, and an application layer that is terminated at the other end of the connection (e.g., far end UE, server, etc.).

The PDCP sublayer 550 provides retransmission of lost data in handover. The PDCP sublayer 550 also provides header compression for upper layer data packets to reduce radio transmission overhead, security by ciphering the data packets, and handover support for UEs between eNBs. The RLC sublayer 540 provides segmentation and reassembly of upper layer data packets, retransmission of lost data packets, and reordering of data packets to compensate for out-of-order reception due to hybrid automatic repeat request (HARQ). The MAC sublayer 530 provides multiplexing between logical and transport channels. The MAC sublayer 530 is also responsible for allocating the various radio resources (e.g., resource blocks) in one cell among the UEs. The MAC sublayer 530 is also responsible for HARQ operations.

In the control plane, the radio protocol architecture for the UE and eNB is substantially the same for the physical layer 510 and the L2 layer 520 with the exception that there is no header compression function for the control plane. The control plane also includes a radio resource control (RRC) sublayer 560 in Layer 3 (L3 layer). The RRC sublayer 560 is responsible for obtaining radio resources (i.e., radio bearers) and for configuring the lower layers using RRC signaling between the eNB and the UE.

As indicated above, FIG. 5 is provided as an example. Other examples are possible and may differ from what was described above in connection with FIG. 5.

Figure 6:
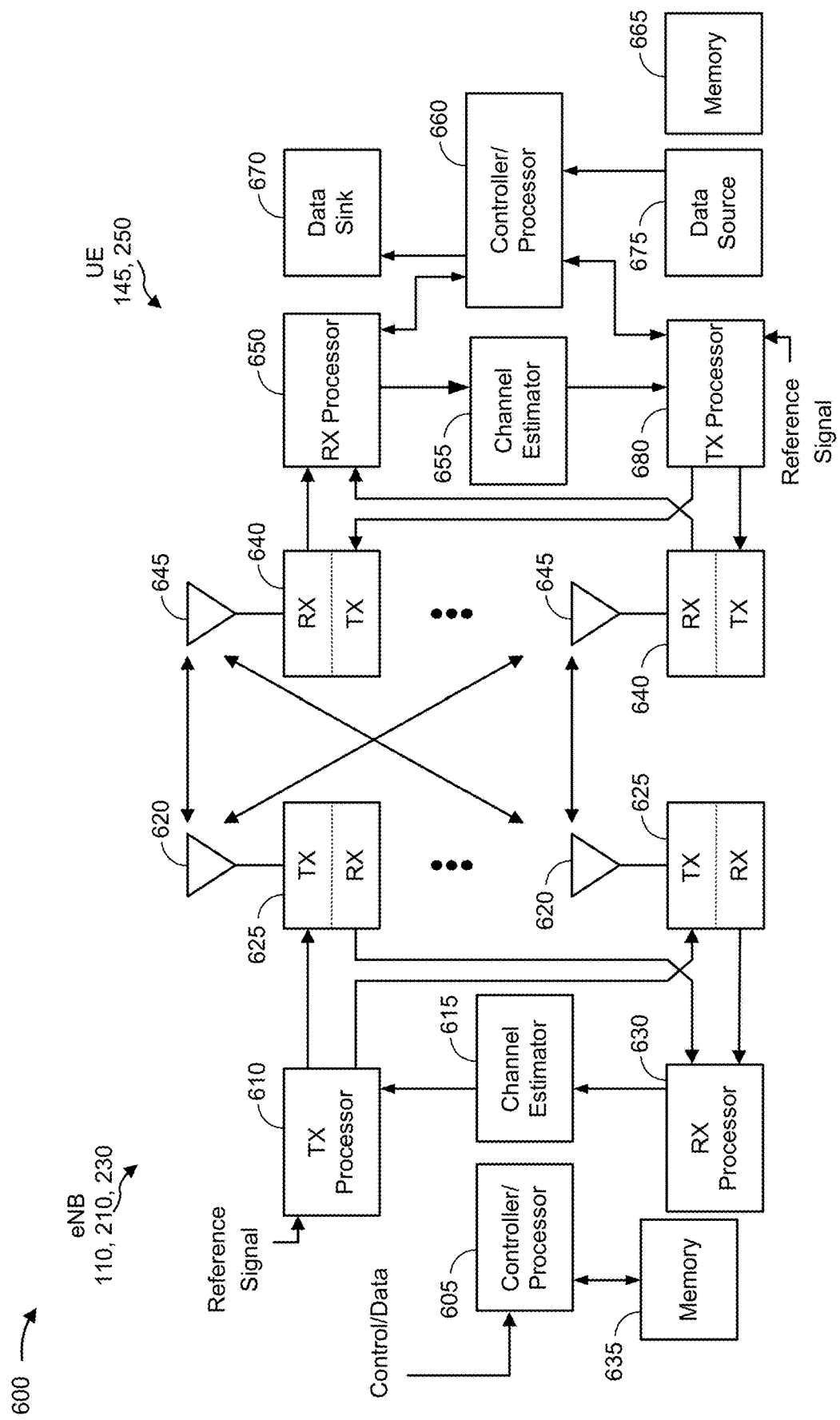
FIG. 6 is a diagram illustrating example components of an evolved Node B and a user equipment in an access network, in accordance with various aspects of the present disclosure.

FIG. 6 is a diagram illustrating example components 600 of eNB 110, 210, 230 and UE 145, 250 in an access network, in accordance with various aspects of the present disclosure. As shown in FIG. 6, eNB 110, 210, 230 may include a controller/processor 605, a TX processor 610, a channel estimator 615, an antenna 620, a transmitter 625TX, a receiver 625RX, an RX processor 630, and a memory 635. As further shown in FIG. 6, UE 145, 250 may include a receiver RX, for example, of a transceiver TX/RX 640, a transmitter TX, for example, of a transceiver TX/RX 640, an antenna 645, an RX processor 650, a channel estimator 655, a controller/processor 660, a memory 665, a data sink 670, a data source 675, and a TX processor 680.

In the DL, upper layer packets from the core network are provided to controller/processor 605. The controller/processor 605 implements the functionality of the L2 layer. In the DL, the controller/processor 605 provides header compression, ciphering, packet segmentation and reordering, multiplexing between logical and transport channels, and radio resource allocations to the UE 145, 250 based, at least in part, on various priority metrics. The controller/processor 605 is also responsible for HARQ operations, retransmission of lost packets, and signaling to the UE 145, 250.

The TX processor 610 implements various signal processing functions for the L1 layer (e.g., physical layer). The signal processing functions includes coding and interleaving to facilitate forward error correction (FEC) at the UE 145, 250 and mapping to signal constellations based, at least in part, on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 615 may be used to determine the coding and modulation scheme, as well as for spatial processing. The channel estimate may be derived from a reference signal and/or channel condition feedback transmitted by the UE 145, 250. Each spatial stream is then provided to a different antenna 620 via a separate transmitter TX, for example, of transceiver TX/RX 625. Each such transmitter TX modulates an RF carrier with a respective spatial stream for transmission.

At the UE 145, 250, each receiver RX, for example, of a transceiver TX/RX 640 receives a signal through its respective antenna 645. Each such receiver RX recovers information modulated onto an RF carrier and provides the information to the receiver (RX) processor 650. The RX processor 650 implements various signal processing functions of the L1 layer. The RX processor 650 performs spatial processing on the information to recover any spatial streams destined for the UE 145, 250. If multiple spatial streams are destined for the UE 145, 250, the spatial streams may be combined by the RX processor 650 into a single OFDM symbol stream. The RX processor 650 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 110, 210, 230. These soft decisions may be based, at least in part, on channel estimates computed by the channel estimator 655. The soft decisions are then decoded and deinterleaved to recover the data and control signals that were originally transmitted by the eNB 110, 210, 230 on the physical channel. The data and control signals are then provided to the controller/processor 660.

The controller/processor 660 implements the L2 layer. The controller/processor 660 can be associated with a memory 665 that stores program codes and data. The memory 665 may include a non-transitory computer-readable medium. In the UL, the controller/processor 660 provides demultiplexing between transport and logical channels, packet reassembly, deciphering, header decompression, control signal processing to recover upper layer packets from the core network. The upper layer packets are then provided to a data sink 670, which represents all the protocol layers above the L2 layer. Various control signals may also be provided to the data sink 670 for L3 processing. The controller/processor 660 is also responsible for error detection using an acknowledgement (ACK) and/or negative acknowledgement (NACK) protocol to support HARQ operations.

In the UL, a data source 675 is used to provide upper layer packets to the controller/processor 660. The data source 675 represents all protocol layers above the L2 layer. Similar to the functionality described in connection with the DL transmission by the eNB 110, 210, 230, the controller/processor 660 implements the L2 layer for the user plane and the control plane by providing header compression, ciphering, packet segmentation and reordering, and multiplexing between logical and transport channels based, at least in part, on radio resource allocations by the eNB 110, 210, 230. The controller/processor 660 is also responsible for HARQ operations, retransmission of lost packets, and signaling to the eNB 110, 210, 230.

Channel estimates derived by a channel estimator 655 from a reference signal or feedback transmitted by the eNB 110, 210, 230 may be used by the TX processor 680 to select the appropriate coding and modulation schemes, and to facilitate spatial processing. The spatial streams generated by the TX processor 680 are provided to different antenna 645 via separate transmitters TX, for example, of transceivers TX/RX 640. Each transmitter TX, for example, of transceiver TX/RX 640 modulates an RF carrier with a respective spatial stream for transmission.

The UL transmission is processed at the eNB 110, 210, 230 in a manner similar to that described in connection with the receiver function at the UE 145, 250. Each receiver RX, for example, of transceiver TX/RX 625 receives a signal through its respective antenna 620. Each receiver RX, for example, of transceiver TX/RX 625 recovers information modulated onto an RF carrier and provides the information to a RX processor 630. The RX processor 630 may implement the L1 layer.

The controller/processor 605 implements the L2 layer. The controller/processor 605 can be associated with a memory 635 that stores program code and data. The memory 635 may be referred to as a computer-readable medium. In the UL, the control/processor 605 provides demultiplexing between transport and logical channels, packet reassembly, deciphering, header decompression, control signal processing to recover upper layer packets from the UE 145, 250. Upper layer packets from the controller/processor 605 may be provided to the core network. The controller/processor 605 is also responsible for error detection using an ACK and/or NACK protocol to support HARQ operations.

One or more components of UE 145, 250 or eNB 110, 210, 230 may be configured to perform monitoring, transmission, and/or resource block bundling for a downlink channel, as described in more detail elsewhere herein. For example, the controller/processor 660 and/or other processors and modules of UE 145, 250 or controller/processor 605 of eNB 110, 210, 230 may perform or direct operations of, for example, process 900 of FIG. 9, process 1000 of FIG. 10, process 1100 of FIG. 11, and/or other processes as described herein. In some aspects, one or more of the components shown in FIG. 6 may be employed to perform process 900 of FIG. 9, process 1000 of FIG. 10, process 1100 of FIG. 11, and/or other processes for the techniques described herein.

The number and arrangement of components shown in FIG. 6 are provided as an example. In practice, there may be additional components, fewer components, different components, or differently arranged components than those shown in FIG. 6. Furthermore, two or more components shown in FIG. 6 may be implemented within a single component, or a single component shown in FIG. 6 may be implemented as multiple, distributed components. Additionally, or alternatively, a set of components (e.g., one or more components) shown in FIG. 6 may perform one or more functions described as being performed by another set of components shown in FIG. 6.

A resource element group (REG) may be used to establish a mapping of control channels to resource elements. A resource block (RB) may include one or more REGs, and each REG may include a set of resource elements (REs). The set of REs that are included in a particular REG may be configured based at least in part on a number of cell-specific reference signals. For example, for a first orthogonal frequency division multiplexed (OFDM) symbol in a first slot of a subframe, an RB may include a first REG, which includes REs 0, 1, 2, 3, 4, and 5, and a second REG, which includes REs 6, 7, 8, 9, 10, and 11. In this case, two REs in each REG may be allocated for the cell-specific reference signal. Thus, each REG includes 4 remaining REs available to allocate for another usage. Similarly, in a second OFDM symbol of the first slot of the subframe, and when either one cell-specific reference signal port or two cell-specific reference signal ports are configured for the network, an RB may include three REGs. In this case, a first REG includes REs 0 to 3, a second REG includes REs 4 to 7, and a third REG including REs 8 to 11. In each case, the RB includes an integer multiple of 4 REs allocated for control transmissions. In this way, 2-port space frequency block coding (SFBC) and/or 4-port SFBC may be implemented for the network.

A UE may be configured for receiving a channel state information reference signal (CSI-RS). The UE may determine a set of criteria, such as that each resource block within an OFDM symbol includes an even number of REs for transmission, a gap between consecutive REs of an OFDM symbol is less than or equal to two REs, and/or the like. When the set of criteria is satisfied, the UE may receive a data transmission transmitted by the network. When one or more of the criteria is not satisfied, and transmit diversity is indicated, an OFDM symbol may not be used for data transmission, and the UE may not monitor one or more network resources (e.g., time resources, frequency resources, etc.) to receive the data transmission.

Figure 7:
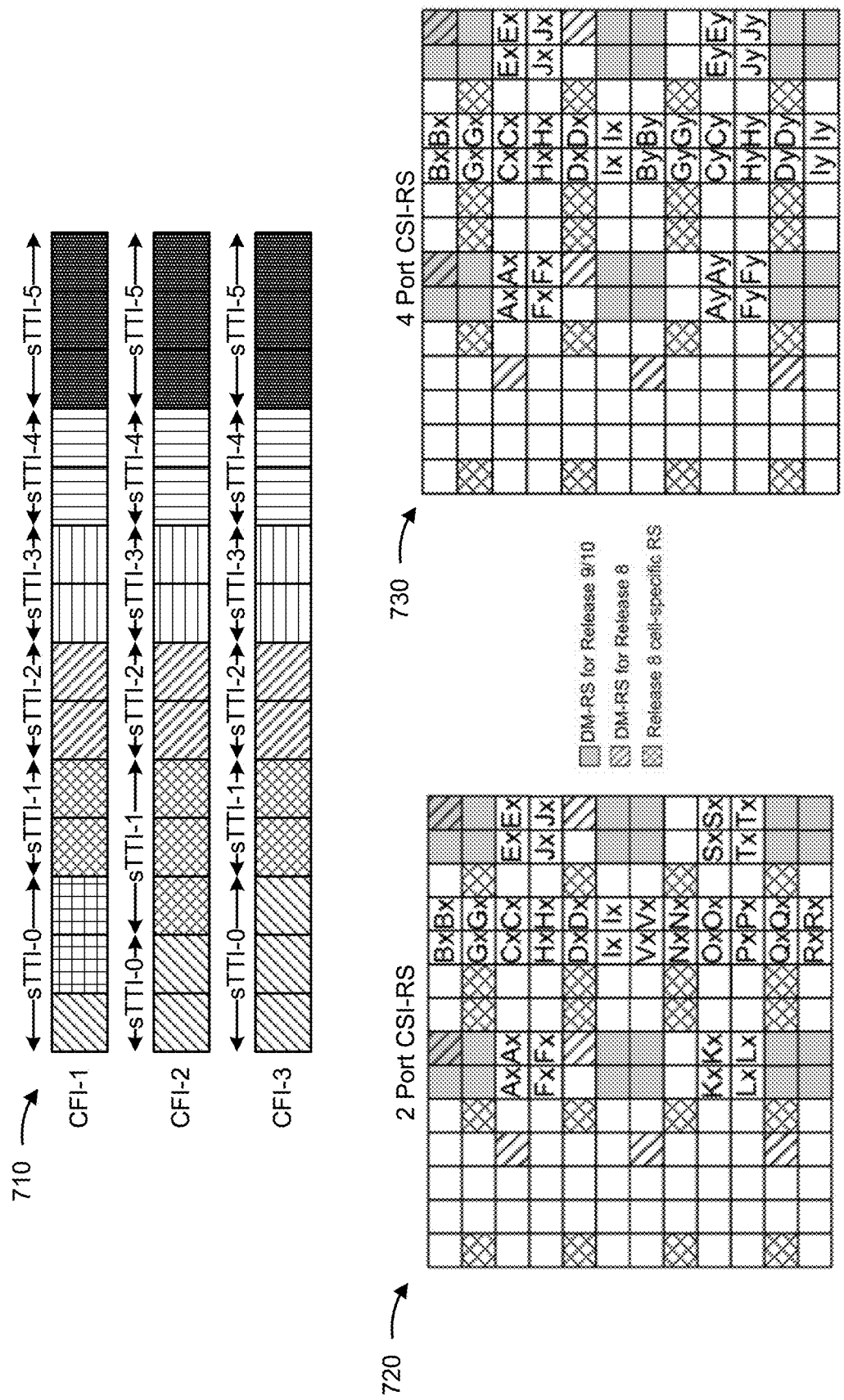
FIG. 7 is a diagram illustrating an example of a downlink layout for short time transmission intervals (sTTIs), in accordance with various aspects of the present disclosure.

FIG. 7 is a diagram of an example 700 illustrating an example of a layout for downlink short transmission time intervals (sTTIs), in accordance with various aspects of the present disclosure.

Downlink sTTIs may operate in a set of modes, such as a 1-slot operation mode, a 2-symbol operation mode, and/or the like. For the 1-slot operation mode, a subframe may be divided into two 1-slot sTTIs. In this case, for frame-structure type 2 (FS2) (e.g., time division duplex (TDD)), each downlink subframe or downlink pilot time slot (DwPTS) may support downlink sTTIs and each uplink subframe or uplink pilot time slot (UpPTS) may support uplink sTTIs.

In contrast, as shown by reference number 710, in a 2-symbol operation mode, a layout for DL sTTIs is determined based at least in part on a control format indicator (CFI) value. Each subframe is configured to include 6 sTTIs (e.g., sTTI-0 through sTTI-5), and each sTTI includes one or more symbols, as shown. For example, sTTI-2 includes two symbols, symbol 5 and symbol 6.

As further shown in FIG. 7, and by reference number 720, for 2-port CSI-RS, resource elements Ax are reserved, causing 11 useable tones to be available for each resource block of symbol 5 and symbol 6. As shown by reference number 730, for 4-port CSI-RS, resource elements Ax and Ay are reserved, causing 10 useable tones for each resource block of symbol 5 and symbol 6.

As indicated above, FIG. 7 is provided as an example. Other examples are possible and may differ from what was described with respect to FIG. 7.

For short channels, such as a short physical downlink control channel (sPDCCH), a short physical downlink shared channel (sPDSCH), and/or the like, procedures for determining whether to transmit a short channel and whether to monitor to receive a short channel may result in poor network performance. For example, in 2-port CSI-RS, symbols 5 and 6 include 11 useable tones, which is not an integer multiple of 2, causing SFBC to not be implemented with a threshold level of efficiency (e.g., one or more REs may not be utilized based at least in part on a modulated symbol not being mapped to the one or more REs). Similarly, in 4-port CSI-RS, symbols 5 and 6 include 10 useable tones, which is not an integer multiple of 4, causing SFBC to not be implemented with a threshold level of efficiency. Moreover, for an sPDSCH, dropping a symbol when a gap between two or more modulated symbols is greater than 2 symbols may result in an excessive reduction in network throughput. In some cases, such as for 2-port SFBC or for 4-port SFBC, a number of useable REs in each short resource element group (sREG) may be an even number. An sREG may include a resource block within an OFDM symbol that includes each RE used for each signal that is to be transmitted.

Some aspects, described herein, provide techniques and apparatuses for transmission of and/or monitoring of downlink control information for short channels, such as an sPDCCH, an sPDSCH, and/or the like. For example, a wireless communication device may determine a monitoring period for a base station to transmit a short channel and the wireless communication device may receive the short channel based at least in part on determining the monitoring period. In this way, network performance for a short channel may be improved. Some aspects, described herein, provide techniques and apparatuses for bundling resource blocks of a short channel for channel estimation. In this way, channel estimation may be improved.

Figure 8:
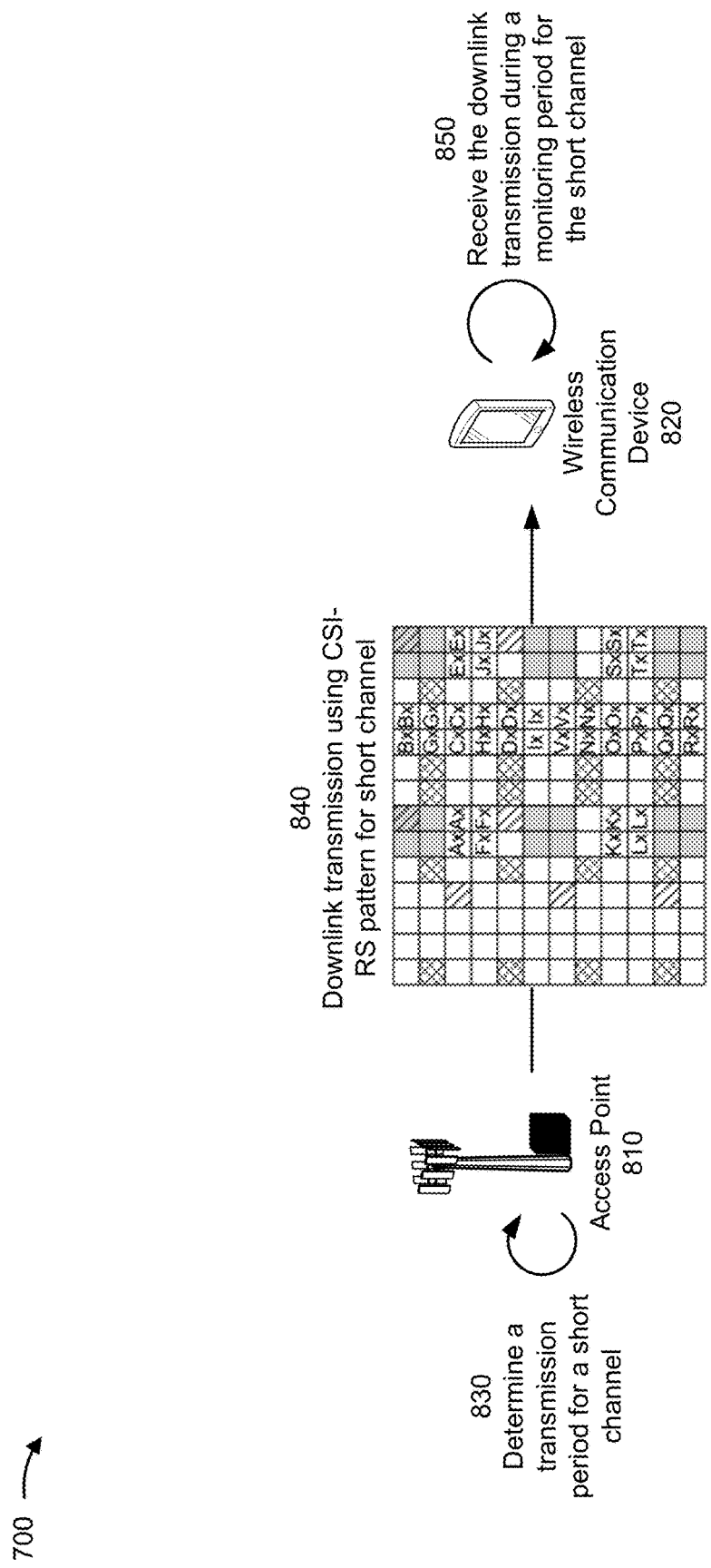
FIG. 8 is a diagram illustrating an example of downlink channel monitoring, in accordance with various aspects of the present disclosure

FIG. 8 is a diagram illustrating an example 800 of downlink channel transmission and/or monitoring, in accordance with various aspects of the present disclosure. As shown in FIG. 8, example 800 includes access point 810 (e.g., an eNB, such as eNB 110, 210, 230) and wireless communication device 820 (e.g., a UE, such as UE 145, 250).

As shown in FIG. 8, and by reference number 830, access point 810 may determine a transmission period for a short channel. Concurrently, wireless communication device 820 may determine a monitoring period for receiving the short channel. For example, when wireless communication device 820 is operating using sTTIs, such as a first sTTI of a first length (e.g., less than 1 millisecond (ms)), a second sTTI of a second length (e.g., 1 ms) that is different from the first length, and/or the like, wireless communication device 820 may determine the monitoring period for receiving an sPDCCH, an sPDSCH, and/or the like. In some aspects, wireless communication device 820 may determine the monitoring period to receive an sPDCCH based at least in part on 2-port SFBC being configured, 4-port SFBC being configured, and/or the like.

In some aspects, wireless communication device 820 may determine the monitoring period based at least in part on a number of useable tones of the short channel. For example, based at least in part on the CSI-RS, the number of resource elements available for sPDCCH may not be an integer multiple of the number of ports used with transmit diversity (e.g., 2-port SFBC, 4-port SFBC). In some aspects, wireless communication device 820 may determine the monitoring period for receiving sPDCCH and perform rate matching in accordance with a maximum of a 4-port CSI-RS or the configured CSI-RS under 2-port SFBC operation. Similarly, with 4-port SFBC, wireless communication device 820 may determine the monitoring period for receiving sPDCCH based at least in part on a maximum of an 8-port CSI-RS pattern or the number of configured CSI-RS ports. Rate matching in this case may proceed under an 8-port CSI-RS assumption. In this way, the number of usable REs is an integer multiple of the number of SFBC ports.

In some aspects, wireless communication device 820 may determine the monitoring period based at least in part on a number of REs used for a CSI-RS. For example, wireless communication device 820 may determine, for 2-port CSI-RS, that 11 REs are available for each RB of symbol 5 and symbol 6. In this case, the 11 REs may comprise 5 paired REs for each RB and 1 orphan RE for each RB. Similarly, for 4-port CSI-RS, wireless communication device 820 may determine that 10 REs are available for each RB of symbol 5 and symbol 6. In this case, the 10 REs may comprise sets of 4 REs for each RB and 2 orphan REs for each RB. In some aspects, wireless communication device 820 may be configured to determine the monitoring period to utilize symbol 5 and symbol 6 despite the one or more orphan REs of symbol 5 and symbol 6.

In some aspects, wireless communication device 820 may determine the monitoring period for a set of RBs based at least in part on identifying the one or more orphan REs. For example, when localized short resource element group (sREG) to short control channel element (sCCE) mapping is configured, wireless communication device 820 may determine that a first modulated symbol is mapped to a first orphan RE in a first sREG (e.g., which, for ultra-low latency LTE, may correspond to a single RB) and one or more second modulated symbols are mapped to one or more second orphan REs in a second sREG that is consecutive to the first sREG. In some aspects, when the first sREG and the second sREG are non-consecutive, the one or more orphan REs may be configured to be skipped for localized sREG-to-sCCE mapping, and wireless communication device 820 may determine the monitoring period based at least in part on the one or more orphan REs being configured to be skipped.

In some aspects, wireless communication device 820 may perform distributed mapping. For example, wireless communication device 820 may determine not to map to a physical resource block (PRB), which may correspond to an sREG, based at least in part on a number of resource elements in the PRB (e.g., an uneven number).

In some aspects, the one or more orphan REs may be configured to be skipped for distributed sREG-to-sCCE mapping. In this case, when distributed sREG-to-sCCE mapping is configured for the network, wireless communication device 820 may determine the monitoring period based at least in part on transmission of the one or more orphan REs being configured to be skipped. In some aspects, an sPDCCH may not be mapped to one or more orphan REs with each sREG. For example, for 2-port SFBC or 4-port SFBC and/or for localized mapping or distributed mapping, wireless communication device 820 may not determine that the sPDCCH is mapped to the orphan REs of an sREG. In some aspects, wireless communication device 820 may not receive the sPDCCH using the orphan REs of sREG.

In some aspects, a short channel may not be mapped to a particular set of tones. For example, a CRS-based sPDCCH may not be mapped to one or more orphan REs, which may be a type of isolated tone. In this case, the one or more orphan REs may remain empty. Similarly, an sPDSCH may not be mapped to one or more orphan REs or another type of isolated tone. In this case, data transmission may not occur on the one or more orphan REs.

In some aspects, some resource elements may not be mapped. For example, for a DCI associated with a PDSCH using C-RNTI or semi-persistent C-RNTI and transmit diversity, and when the DCI associated with the PDSCH is not of a particular format (format 7) and a parameter semiOpenLoop is not set, resource elements in an OFDM symbol may be used in mapping if there are an even number of resource elements for the OFDM symbol in each resource block, and if complex-valued symbols ($y^{(p)}(i)$ and $y^{(p)}(i+1)$, where i is even) can be mapped to resource elements (k, l) and (k+n, l) in a same OFDM symbol (with n<3). In some aspects, when the parameter semiOpenLoop is set or the DCI is of the particular format, resource elements (k', l), (k'+n, l) may be used in mapping if the complex-valued symbols can be mapped to the resource elements in a same OFDM symbol (with n<3) and same physical resource block, where i is an even number and k' starts from 0 at a lowest subcarrier of a physical resource block.

In some aspects, wireless communication device 820 may determine the monitoring period for an sPDSCH. For example, wireless communication device 820 may determine the monitoring period based at least in part on 2-symbol sTTI being used for data transmission for a gap between two modulated symbols of greater than 2 REs. In some aspects, the monitoring period may be defined based at least in part on a number of REs. Additionally, or alternatively, the monitoring period may be defined in terms of time, frequency, and/or the like. In some aspects, wireless communication device 820 may determine a gap greater than 2 REs for sTTI, and may determine the monitoring period based at least in part on a type of sTTI. For example, for 1-slot sTTI, wireless communication device 820 may determine a first monitoring period for a first gap size, and for 2-symbol sTTI, wireless communication device 820 may determine a second monitoring period for a second gap size larger than the first gap size.

As further shown in FIG. 8, and by reference numbers 840 and 850, access point 810 may transmit the downlink transmission based at least in part on determining the transmission period, and wireless communication device 820 may receive the downlink transmission based at least in part on determining the monitoring period. For example, wireless communication device 820 may receive a set of REs based at least in part on monitoring during the monitoring period. In some aspects, wireless communication device 820 may receive modulated symbols associated with one or more orphan REs. For example, wireless communication device 820 may receive the modulated symbols without transmit diversity, which may improve resource utilization relative to the network being configured to skip the one or more orphan REs.

In some aspects, a transmit power associated with one or more REs may be increased based at least in part on skipping transmission of the one or more orphan REs. For example, access point 810 may determine that one or more orphan REs are to be skipped, and may determine to increase a power for each RB from a baseline short channel power to a target short channel power, and wireless communication device 820 may receive each RB based at least in part on the increased power. In this case, access point 810 may increase the transmit power by a factor of Y/X where Y represents a maximum number of REs that can be used in an RB (e.g., 12) and X represents a number of REs that are used in the RB.

In some aspects, the one or more orphan REs may be skipped based at least in part on a number of useable tones (and not based at least in part on a configured CSI-RS). For example, when the number of useable tones is not an integer multiple of 2, then a remaining RE may be skipped for sPDCCH mapping. In this case, the remaining RE may not be used for PDSCH mapping. In some aspects, an RB may not be dropped based at least in part on a number of REs. For example, when the number of REs per RB is not even, the RB may not be dropped but, instead, orphan REs for each RB may not be used in mapping a PDSCH.

In some aspects, wireless communication device 820 may determine that an sPDSCH is mapped to unused resources of the sPDCCH. In this case, for SFBC, orphan REs of an sREG that were not used for the sPDCCH may not be used for the sPDSCH.

In some aspects, wireless communication device 820 may receive a plurality of resource blocks (e.g., consecutive resource blocks associated with a plurality of consecutive sREGs of a particular sCCE) of the short channel. For example, when using localized sREG-to-sCCE mapping, wireless communication device 820 may receive the plurality of resource blocks of the short channel, and may process the short channel using the plurality of resource blocks. In this case, wireless communication device 820 may bundle the plurality of resource blocks into a set of resource block bundles based at least in part on the sREG-to-sCCE mapping. In some aspects, wireless communication device 820 may bundle a plurality of non-consecutive resource blocks based at least in part on a corresponding plurality of sREGs of a particular sCCE being included in a single sub-band of resource blocks of the plurality of non-consecutive resource blocks. In this way, wireless communication device 820 may improve channel estimation for the short channel. In some aspects, such as when using localized sREG-to-sCCE mapping for consecutive sREGs or sREGs within a threshold proximity in network resource utilization (e.g., a threshold proximity in time, frequency, etc.), a beamforming gain may be achieved. For example, when each sREG of an sCCE or each RB of a set of RBs is consecutive, a resource indication scheme may be configured, which may provide a beamforming gain, enable RB bundling, reduce an RB overhead, improve channel estimation, and/or the like. Additionally, or alternatively, if the sREGs within an RB are non-consecutive, RB bundling may be performed for sREGs of a particular sCCE that are included in a sub-band of a particular number of RBs.

As indicated above, FIG. 8 is provided as an example. Other examples are possible and may differ from what was described with respect to FIG. 8.

Figure 9:
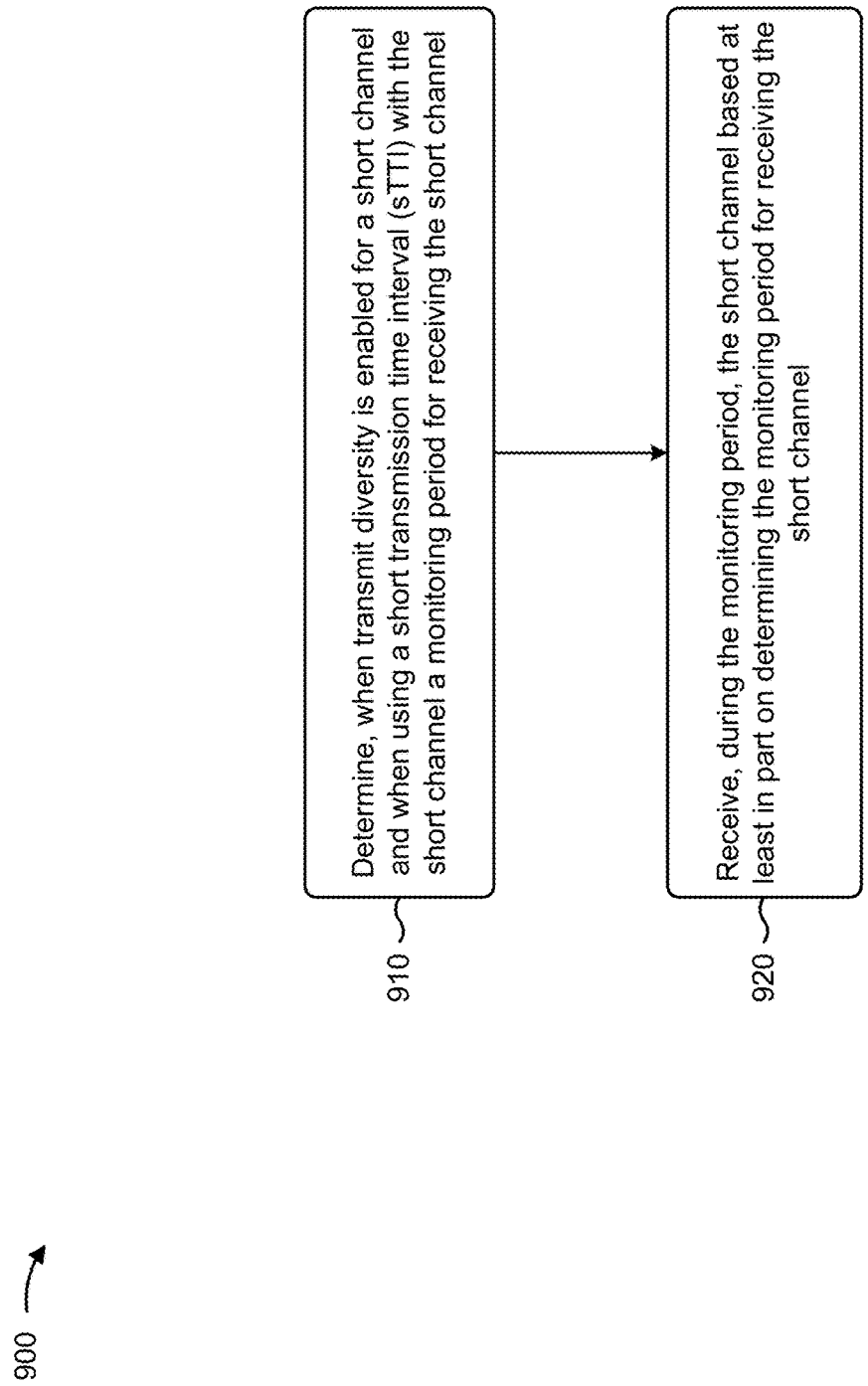
FIG. 9 is a diagram illustrating an example process performed, for example, by a user equipment, in accordance with various aspects of the present disclosure.

FIG. 9 is a diagram illustrating an example process 900 performed, for example, by a wireless communication device, in accordance with various aspects of the present disclosure. Example process 900 is an example where a wireless communication device (e.g., UE 145, 250 or wireless communication device 820) performs downlink channel monitoring.

As shown in FIG. 9, in some aspects, process 900 may include determining, when transmit diversity is enabled for a short channel and when using a short transmission time interval (sTTI) with the short channel, a monitoring period for receiving the short channel (block 910). For example, the wireless communication device (e.g., using controller/processor 660 and/or the like) may determine the monitoring period for receiving the short channel, as described above. In some aspects, the sTTI is associated with a duration that is shorter than a duration of a transmission time interval (TTI) used with another channel.

As further shown in FIG. 9, in some aspects, process 900 may include receiving, during the monitoring period, the short channel based at least in part on determining the monitoring period for receiving the short channel (block 920). For example, the wireless communication device (e.g., using antenna 645, receiver 640, RX processor 650, and/or the like) may receive the short channel, as described above. In some aspects, the short channel is a short physical downlink control channel (sPDCCH) or a short physical downlink shared channel (sPDSCH) and the monitoring period is determined based at least in part on a number of useable tones of the short channel being an integer multiple of 2.

Process 900 may include additional aspects, such as any single aspect or any combination of aspects described below.

In some aspects, the short channel is a short physical downlink control channel (sPDCCH) or a short physical downlink shared channel (sPDSCH) and a number of useable tones of the short channel is an integer multiple of 2. In some aspects, the short channel is associated with 2-port SFBC, and the wireless communication device is configured to determine the monitoring period based at least in part on a configuration of a particular number of configured ports and based at least in part on a 4-port channel state information reference signal (CSI-RS) configuration for one or more sTTIs and based at least in part on a number of useable tones of the short channel being an integer multiple of 2. In some aspects, the wireless communication device performs rate-matching around one or more resource elements (REs) associated with the 4-port CSI-RS or the particular number of configured ports.

In some aspects, an sPDCCH is not received using one or more orphan resource elements (REs) of one or more short resource element groups (sREGs). In some aspects, the monitoring period is determined based at least in part on one or more orphan resource elements (REs), which are not used for an sPDCCH transmission, not being used for an sPDSCH transmission. In some aspects, a resource element (RE) is skipped based at least in part on an index value of the RE being greater than one or more other index values of one or more other REs (e.g., a highest valued RE is skipped). In some aspects, distributed short resource element group (sREG) to short control channel element (sCCE) mapping is enabled for the short channel. In some aspects, a transmit power of the received short channel varies based at least in part on a number of usable resource elements (REs) in a resource block. In some aspects, the monitoring period is determined based at least in part on a gap between two modulated symbols of the short channel being greater than two resource elements (REs) and based at least in part on a duration of the sTTI.

In some aspects, the number of useable tones in each resource block of the short channel is an integer multiple of 2. In some aspects, the short channel is associated with 4-port SFBC, and the wireless communication device is configured to determine the monitoring period based at least in part on a configuration of a particular number of configured ports and based at least in part on an 8-port channel state information reference signal (CSI-RS) configuration for one or more sTTIs and based at least in part on a number of useable tones of the short channel being an integer multiple of 4. In some aspects, the wireless communication device performs rate-matching around one or more resource elements (REs) associated with the 8-port CSI-RS or the particular number of configured ports.

In some aspects, the number of useable tones in each resource block of the short channel is an integer multiple of 4. In some aspects, the monitoring period is determined based at least in part on a number of REs used for a CSI-RS. In some aspects, a short REG includes one or more of the REs and one or more orphan REs.

In some aspects, localized sREG-to-sCCE mapping is enabled for the short channel. In some aspects, the monitoring period is determined based at least in part on a first one or more modulated symbols being mapped to one or more orphan REs in a first sREG and a second one or more modulated symbols being mapped to one or more other REs in a second sREG. In some aspects, the first sREG and the second sREG are consecutive sREGs with a threshold number of REs and are each associated with the short channel. In some aspects, one or more orphan REs are associated with non-consecutive sREGs, and the monitoring period is determined based at least in part on the one or more orphan REs being skipped for short channel mapping.

In some aspects, distributed sREG-to-sCCE mapping is enabled for the short channel. In some aspects, the monitoring period is determined based at least in part on one or more orphan REs being skipped for short channel mapping. In some aspects, a short channel power is increased from a baseline short channel power to a target short channel power based at least in part on a number of usable REs in a resource block.

In some aspects, the receiving is performed based at least in part on one or more orphan REs that include one or more modulated symbols. In some aspects, a gap between two modulated symbols of the short channel is greater than two REs, and the monitoring period is determined based at least in part on data being transmitted during each symbol of a two symbol sTTI. In some aspects, the monitoring period is determined based at least in part on a gap between two modulated symbols of the short channel being greater than two REs and based at least in part on a type of sTTI.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
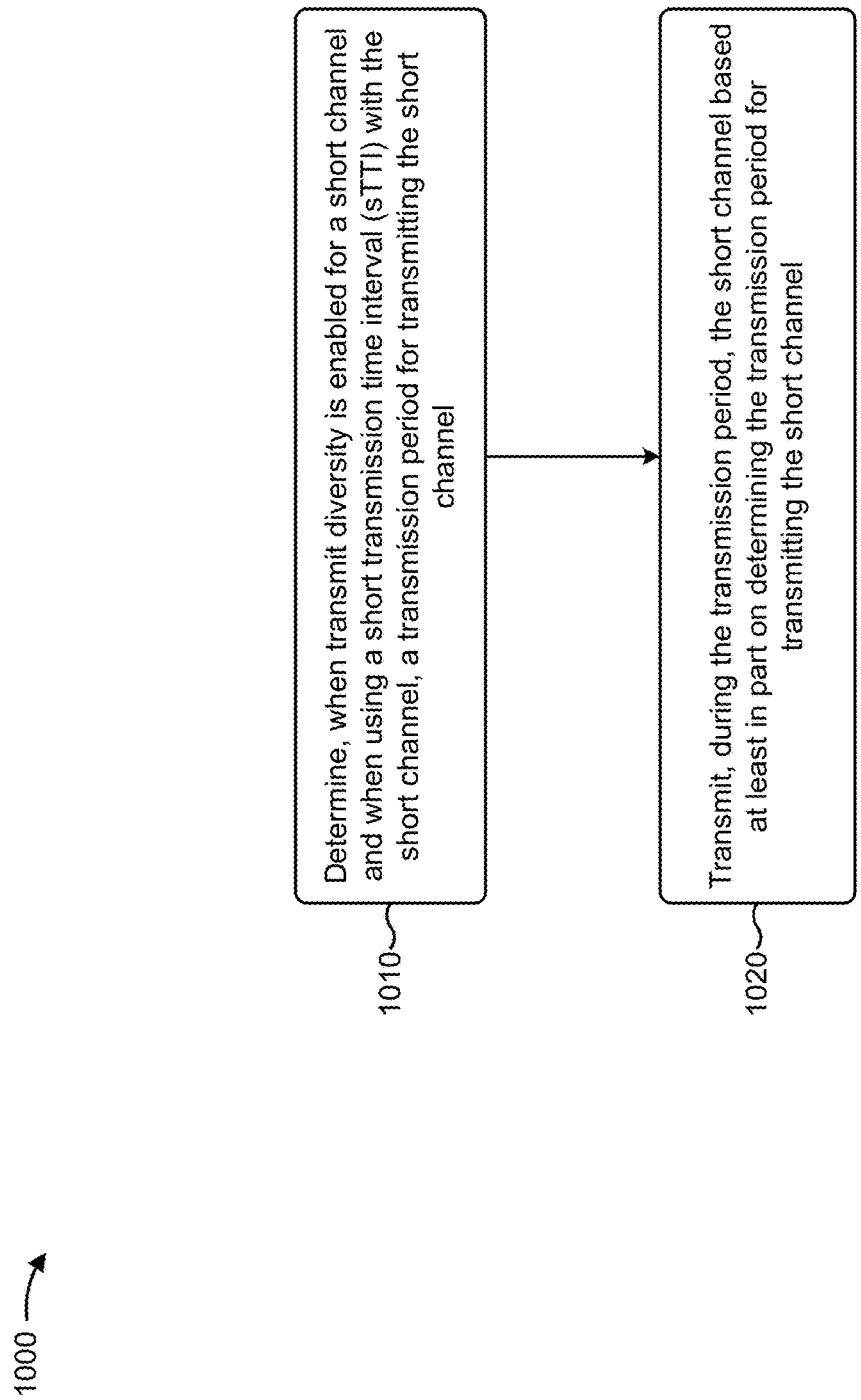
FIG. 10 is a diagram illustrating an example process performed, for example, by an access point, in accordance with various aspects of the present disclosure.

FIG. 10 is a diagram illustrating an example process 1000 performed, for example, by an access point, in accordance with various aspects of the present disclosure. Example process 1000 is an example where an access point (e.g., eNB 110, 210, 230 or access point 810) performs downlink channel transmission. In some aspects, the access point may perform any or all of the operations described with regard to FIG. 9 and/or any or all operations ancillary to and/or performed in conjunction or association therewith.

As shown in FIG. 10, in some aspects, process 1000 may include determining, when transmit diversity is enabled for a short channel and when using a short transmission time interval (sTTI) with the short channel, a transmission period for transmitting the short channel (block 1010). For example, the access point (e.g., using controller/processor 605 and/or the like) may determine the transmission period for the short channel, as described above. In some aspects, the sTTI is associated with a duration that is shorter than a duration of a transmission time interval (TTI) used with another channel.

As further shown in FIG. 10, in some aspects, process 1000 may include transmitting, during the transmission period, the short channel based at least in part on determining the transmission period for transmitting the short channel (block 1020). For example, the access point (e.g., using antenna 620, transmitter 625, TX processor 610, and/or the like) may transmit the short channel, as described above. In some aspects, the short channel is a short physical downlink control channel (sPDCCH) or a short physical downlink shared channel (sPDSCH).

Process 1000 may include additional aspects, such as any single aspect or any combination of aspects described below.

In some aspects, the short channel is an sPDCCH or an sPDSCH. In some aspects, the short channel is associated with 2-port space frequency block coding (SFBC), and the wireless communication device is configured to determine the transmission period based at least in part on a configuration of a particular number of configured ports and based at least in part on a 4-port channel state information reference signal (CSI-RS) configuration for one or more sTTIs and based at least in part on the number of useable tones of the short channel being the integer multiple of 2.

In some aspects, the access point performs rate-matching around one or more resource elements (REs) associated with the 4-port CSI-RS or the particular number of configured ports. In some aspects, the number of useable tones in each resource block of the short channel is an integer multiple of 2. In some aspects, the short channel is associated with 4-port space frequency block coding (SFBC), and the wireless communication device is configured to determine the transmission period based at least in part on a configuration of a particular number of configured ports and based at least in part on an 8-port channel state information reference signal (CSI-RS) configuration for one or more sTTIs and based at least in part on the number of useable tones of the short channel being an integer multiple of 4.

In some aspects, an sPDCCH is not transmitted using one or more orphan resource elements (REs) of one or more short resource element groups (sREGs). In some aspects, the monitoring period is determined based at least in part on one or more orphan resource elements (REs), which are not used for an sPDCCH transmission, not being used for an sPDSCH transmission.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
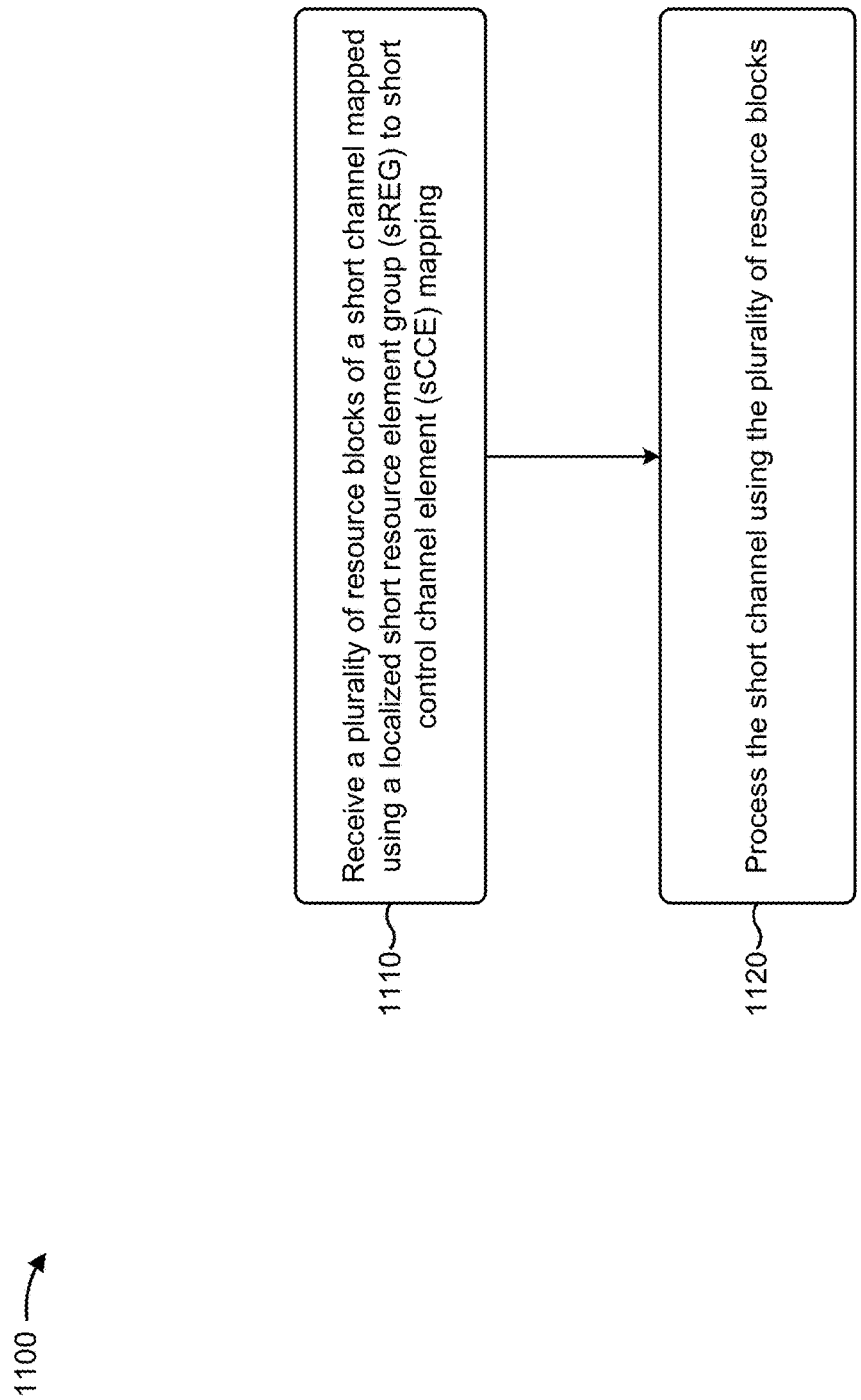
FIG. 11 is a diagram illustrating an example process performed, for example, by a user equipment, in accordance with various aspects of the present disclosure.

FIG. 11 is a diagram illustrating an example process 1100 performed, for example, by a wireless communication device, in accordance with various aspects of the present disclosure. Example process 1100 is an example where a wireless communication device (e.g., UE 145, 250 or wireless communication device 820) performs resource block bundling.

As shown in FIG. 11, in some aspects, process 1100 may include receiving a plurality of resource blocks of a short channel mapped using a short resource element group (sREG) to short control channel element (sCCE) mapping (block 1110). For example, the wireless communication device (e.g., using antenna 645, receiver 640, RX processor 650, and/or the like) may receive the plurality of resource blocks of the short channel, as described above.

As further shown in FIG. 11, in some aspects, process 1100 may include processing the short channel using the plurality of resource blocks (e.g., using RX processor 650, controller/processor 660, and/or the like) may process the short channel using the plurality of resource blocks, as described above. In some aspects, the plurality of resource blocks being bundled into a set of resource block bundles based at least in part on the localized sREG-to-sCCE mapping.

Process 1100 may include additional aspects, such as any single aspect or any combination of aspects described below.

In some aspects, the short channel is a short physical downlink control channel (sPDCCH). In some aspects, the plurality of resource blocks may be bundled into a set of resource block bundles based at least in part on the localized sREG-to-sCCE mapping.

In some aspects, localized sREG-to-sCCE mapping is used based at least in part on a plurality of sREGs of a single sCCE being consecutive. In some aspects, a plurality of sREGs of a particular sCCE are consecutive, and the plurality of resource blocks are bundled for channel estimation based at least in part on the plurality of sREGs of the particular sCCE being consecutive. In some aspects, a set of resource blocks, of the plurality of resource blocks, are consecutive, and the plurality of resource blocks are bundled based at least in part on the set of resource blocks being consecutive. In some aspects, one or more resource blocks of the plurality of resource blocks are non-consecutive, and the plurality of resource blocks are bundled based at least in part on a set of sREGs of a particular sCCE being included in a single sub-band of resource blocks of the plurality of resource blocks.

Although FIG. 11 shows example blocks of process 1100, in some aspects, process 11 may include additional blocks, fewer blocks, different blocks, or differently arranged blocks than those depicted in FIG. 1100. Additionally, or alternatively, two or more of the blocks of process 1100 may be performed in parallel.

The foregoing disclosure provides illustration and description, but is not intended to be exhaustive or to limit the aspects to the precise form disclosed. Modifications and variations are possible in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A wireless communication device, comprising:
   a memory; and
   one or more processors coupled to the memory, the one or more processors configured to:
   determine, when transmit diversity is enabled for a channel and when using a short transmission time interval (sTTI) with the channel, a monitoring period for receiving the channel,
      wherein the sTTI is associated with a duration that is shorter than a duration of a transmission time interval (TTI) used with another channel, and
      wherein the monitoring period is determined based at least in part on a number of resource elements (REs) used for a channel state information reference signal (CSI-RS); and
   receive, during the monitoring period, the channel based at least in part on determining the monitoring period for receiving the channel,
      wherein the channel is a short physical downlink control channel (sPDCCH) or a short physical downlink shared channel (sPDSCH) and the monitoring period is determined based at least in part on a number of useable tones of the channel being an integer multiple of 2.

2. The wireless communication device of claim 1, wherein 2-port space frequency block coding (SFBC) is enabled for the channel; and
   wherein the one or more processors are configured to determine the monitoring period based at least in part on a configuration of a particular number of configured ports and based at least in part on a 4-port channel state information reference signal (CSI-RS) configuration for the sTTI.

3. The wireless communication device of claim 2, wherein the channel is the sPDCCH, and wherein the monitoring period omits one or more orphan resource elements (REs) of one or more short resource element groups (sREGs).

4. The wireless communication device of claim 1, wherein 4-port space frequency block coding (SFBC) is enabled for the channel; and
   wherein the one or more processors are configured to determine the monitoring period based at least in part on a configuration of a particular number of configured ports and based at least in part on an 8-port channel state information reference signal (CSI-RS) configuration for the sTTI and based at least in part on the number of useable tones of the channel being an integer multiple of 4.

5. The wireless communication device of claim 4, wherein the one or more processors are configured to perform rate-matching around one or more resource elements (REs) associated with the 8-port CSI-RS.

6. The wireless communication device of claim 1, wherein the monitoring period is determined based at least in part on a first one or more modulated symbols in a first short resource element group (sREG) and a second one or more modulated symbols in a second sREG.

7. The wireless communication device of claim 6, wherein the first sREG and the second sREG are consecutive sREGs with a threshold number of REs and are each associated with the channel.

8. The wireless communication device of claim 1, wherein the number of useable tones is determined based at least in part on one or more orphan resource elements (REs) being skipped for channel mapping.

9. The wireless communication device of claim 1, wherein a resource element (RE) is skipped based at least in part on an index value of the RE being greater than one or more other index values of one or more other REs.

10. The wireless communication device of claim 1, wherein distributed short resource element group (sREG) to short control channel element (sCCE) mapping is enabled for the channel.

11. The wireless communication device of claim 1, wherein a transmit power of the received channel varies based at least in part on a number of usable resource elements (REs) in a resource block.

12. The wireless communication device of claim 1, wherein the monitoring period is determined based at least in part on a gap between two modulated symbols of the channel being greater than two resource elements (REs) and based at least in part on the duration of the sTTI.

13. The wireless communication device of claim 1, wherein the monitoring period is determined based at least in part on one or more orphan resource elements (REs), which are not used for a sPDCCH transmission, not being used for a sPDSCH transmission.

14. The wireless communication device of claim 13, wherein the one or more processors are configured to receive the sPDSCH transmission using another resource that is different from the one or more orphan REs.

15. A wireless communication device, comprising:
a memory; and
one or more processors coupled to the memory, the one or more processors configured to:
determine, when transmit diversity is enabled for a channel and when using a short transmission time interval (sTTI) with the channel, a transmission period for transmitting the channel,
wherein the sTTI is associated with a duration that is shorter than a duration of a transmission time interval (TTI) used with another channel; and
transmit, during the transmission period, the channel based at least in part on determining the transmission period for transmitting the channel,
wherein the channel is a short physical downlink control channel (sPDCCH) or a short physical downlink shared channel (sPDSCH), and
wherein a resource element (RE) is skipped based at least in part on an index value of the RE being greater than one or more other index values of one or more other REs.

16. The wireless communication device of claim 15, wherein 2-port space frequency block coding (SFBC) is enabled for the channel; and
wherein the one or more processors are configured to determine the transmission period based at least in part on a configuration of a particular number of configured ports and based at least in part on a 4-port channel state information reference signal (CSI-RS) configuration for one or more sTTIs and based at least in part on a number of useable tones of the channel being an integer multiple of 2.

17. The wireless communication device of claim 15, wherein a sPDCCH transmission is not transmitted using one or more orphan resource elements (REs) of one or more short resource element groups (sREGs).

18. The wireless communication device of claim 15, wherein a number of useable tones in each resource block of the channel is an integer multiple of 2.

19. The wireless communication device of claim 15, wherein 4-port space frequency block coding (SFBC) is enabled for the channel; and
wherein the one or more processors are configured to determine the transmission period based at least in part on a configuration of a particular number of configured ports and based at least in part on an 8-port channel state information reference signal (CSI-RS) configuration for one or more sTTIs and based at least in part on a number of useable tones of the channel being an integer multiple of 4.

20. The wireless communication device of claim 15, wherein the transmission period is determined based at least in part on one or more orphan resource elements (REs), which are not used for a sPDCCH transmission, not being used for a sPDSCH transmission.

21. The wireless communication device of claim 20, wherein the one or more processors are configured to transmit the sPDSCH transmission using another resource that is different from the one or more orphan REs.

22. A method of wireless communication performed by a wireless communication device, comprising:
determining, when transmit diversity is enabled for a channel and when using a short transmission time interval (sTTI) with the channel, a monitoring period for receiving the channel,
wherein the sTTI is associated with a duration that is shorter than a duration of a transmission time interval (TTI) used with another channel; and
receiving, during the monitoring period, the channel based at least in part on determining the monitoring period for receiving the channel,
wherein the channel is a short physical downlink control channel (sPDCCH) and the monitoring period is determined based at least in part on a number of useable tones of the channel being an integer multiple of 2,
wherein 2-port space frequency block coding (SFBC) is enabled for the channel,
wherein the wireless communication device is configured to determine the monitoring period based at least in part on a configuration of a particular number of configured ports and based at least in part on a 4-port channel state information reference signal (CSI-RS) configuration for the sTTI, and
wherein the monitoring period omits one or more orphan resource elements (REs) of one or more short resource element groups (sREGs).

23. The method of claim 22, wherein 4-port space frequency block coding (SFBC) is enabled for the channel; and
wherein the wireless communication device is configured to determine the monitoring period based at least in part on a configuration of a particular number of configured ports and based at least in part on an 8-port channel state information reference signal (CSI-RS) configuration for the sTTI and based at least in part on the number of useable tones of the channel being an integer multiple of 4.

24. The method of claim 22, wherein the monitoring period is determined based at least in part on a first one or more modulated symbols in a first short resource element group (sREG) and a second one or more modulated symbols in a second sREG.

25. The method of claim 24, wherein the first sREG and the second sREG are consecutive sREGs with a threshold number of REs and are each associated with the channel.

26. The method of claim 22, wherein the number of useable tones is determined based at least in part on one or more orphan resource elements (REs) being skipped for channel mapping.

27. The method of claim 22, wherein a resource element (RE) is skipped based at least in part on an index value of the RE being greater than one or more other index values of one or more other REs.

28. A method of wireless communication performed by a wireless communication device, comprising:
determining, when transmit diversity is enabled for a channel and when using a short transmission time interval (sTTI) with the channel, a transmission period for transmitting the channel,
wherein the sTTI is associated with a duration that is shorter than a duration of a transmission time interval (TTI) used with another channel; and transmitting, during the transmission period, the channel based at least in part on determining the transmission period for transmitting the channel, wherein the channel is a short physical downlink control channel (sPDCCH) or a short physical downlink shared channel (sPDSCH), and wherein a resource element (RE) is skipped based at least in part on an index value of the RE being greater than one or more other index values of one or more other REs.

29. The method of claim 28, wherein 2-port space frequency block coding (SFBC) is enabled for the channel; and wherein the wireless communication device is configured to determine the transmission period based at least in part on a configuration of a particular number of configured ports and based at least in part on a 4-port channel state information reference signal (CSI-RS) configuration for one or more sTTIs and based at least in part on a number of useable tones of the channel being an integer multiple of 2.

30. The method of claim 28, wherein a sPDCCH transmission is not transmitted using one or more orphan resource elements (REs) of one or more short resource element groups (sREGs).

\* \* \* \* \*